United States Patent
Dubeyko et al.

(10) Patent No.: US 11,157,692 B2
(45) Date of Patent: Oct. 26, 2021

(54) NEURAL NETWORKS USING DATA PROCESSING UNITS

(71) Applicant: Western Digital Technologies, Inc., San Jose, CA (US)

(72) Inventors: Viacheslav Dubeyko, San Jose, CA (US); Luis Vitorio Cargnini, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 186 days.

(21) Appl. No.: 16/370,616

(22) Filed: Mar. 29, 2019

(65) Prior Publication Data

US 2020/0311200 A1 Oct. 1, 2020

(51) Int. Cl.
*G06F 40/242* (2020.01)
*G06N 3/08* (2006.01)

(52) U.S. Cl.
CPC .......... *G06F 40/242* (2020.01); *G06N 3/08* (2013.01)

(58) Field of Classification Search
CPC ........... G06F 40/242; G06F 9/50; G06N 3/08
See application file for complete search history.

(56) References Cited

U.S. PATENT DOCUMENTS

| | | | | |
|---|---|---|---|---|
| 10,354,733 B1* | 7/2019 | Zejda | | G06N 3/063 |
| 10,445,638 B1* | 10/2019 | Amirineni | | G06F 17/16 |
| 10,515,135 B1* | 12/2019 | Zejda | | G06F 7/53 |
| 10,768,856 B1* | 9/2020 | Diamant | | G11C 11/413 |
| 2009/0083029 A1* | 3/2009 | Doi | | G10L 15/26 704/200 |
| 2009/0083227 A1* | 3/2009 | Doi | | G06F 16/78 |
| 2014/0278379 A1* | 9/2014 | Coccaro | | G10L 15/1822 704/202 |
| 2018/0004860 A1* | 1/2018 | Miyakoshi | | G06F 16/2379 |
| 2018/0113933 A1* | 4/2018 | Lewis | | G06F 16/243 |
| 2018/0121120 A1* | 5/2018 | Niu | | G06F 3/0604 |
| 2018/0121130 A1* | 5/2018 | Li | | G11C 11/405 |

(Continued)

*Primary Examiner* — Anne L Thomas-Homescu
(74) *Attorney, Agent, or Firm* — Ravi Mohan; Rutan & Tucker, LLP

(57) ABSTRACT

In some implementations, a computing system is provided. The computing system includes a device. The device includes a non-volatile memory divided into a plurality of memory sub-arrays. Each memory sub-array comprises a plurality of selectable locations. A plurality of data processing units are communicatively coupled to the non-volatile memory in the absence of a central processing unit of the computing system. The data processing unit is assigned to process data of a memory sub-array, and configured to store the first data object in the non-volatile memory receive a first data object via a communication interface. The first data object comprises a first content and is associated with a first set of keywords. The data processing unit is also configured to add the first set of keywords to a local dictionary. The local dictionary is stored in the non-volatile memory. The data processing unit is further configured to determine whether the first data object is related to one or more other data objects. The data processing units is further configured to create one or more relationships between the first data object and the one or more other data objects in response to determining that the first data object is related to one or more other data objects.

19 Claims, 14 Drawing Sheets

(56) References Cited

U.S. PATENT DOCUMENTS

| | | | |
|---|---|---|---|
| 2018/0122456 A1* | 5/2018 | Li | G11C 11/4076 |
| 2018/0189635 A1* | 7/2018 | Olarig | G06N 3/0454 |
| 2018/0293057 A1* | 10/2018 | Sun | G06N 3/105 |
| 2018/0330232 A1* | 11/2018 | Ronayne | G06F 16/951 |
| 2019/0026076 A1* | 1/2019 | Leng | G06F 5/08 |
| 2019/0056955 A1* | 2/2019 | Pennala | G06F 9/5083 |
| 2019/0130933 A1* | 5/2019 | Liang | G10L 25/30 |
| 2019/0156180 A1* | 5/2019 | Nomura | G06N 3/08 |
| 2019/0205636 A1* | 7/2019 | Saraswat | G06F 16/93 |
| 2019/0228291 A1* | 7/2019 | Kurasawa | G06F 17/16 |
| 2019/0244077 A1* | 8/2019 | Franca-Neto | G06N 3/0454 |
| 2019/0244082 A1* | 8/2019 | Franca-Neto | G06N 3/0481 |
| 2019/0244106 A1* | 8/2019 | Franca-Neto | G06N 3/0481 |
| 2019/0311215 A1* | 10/2019 | Andersson | G06K 9/6262 |
| 2019/0325298 A1* | 10/2019 | Chen | G06N 3/0445 |
| 2019/0355346 A1* | 11/2019 | Bellegarda | G06N 5/022 |
| 2019/0392232 A1* | 12/2019 | Ma | G06K 9/6274 |
| 2020/0098017 A1* | 3/2020 | Bhardwaj | G06Q 30/0278 |
| 2020/0151020 A1* | 5/2020 | Dubeyko | G06F 9/30003 |
| 2020/0211370 A1* | 7/2020 | Chen | G05D 1/0088 |
| 2020/0265495 A1* | 8/2020 | Cho | G06Q 30/0629 |
| 2020/0351326 A1* | 11/2020 | Koohestanian | H04L 67/025 |

* cited by examiner

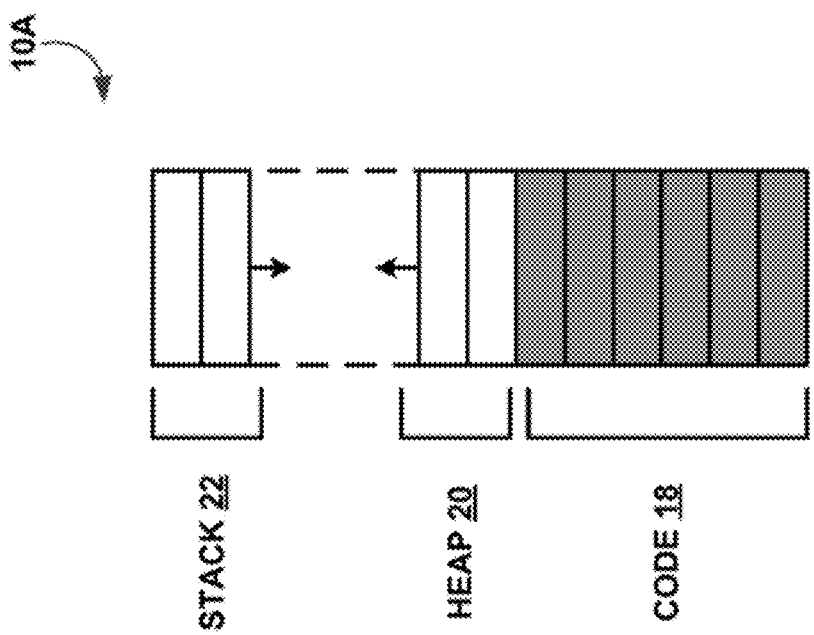
Figure 6B
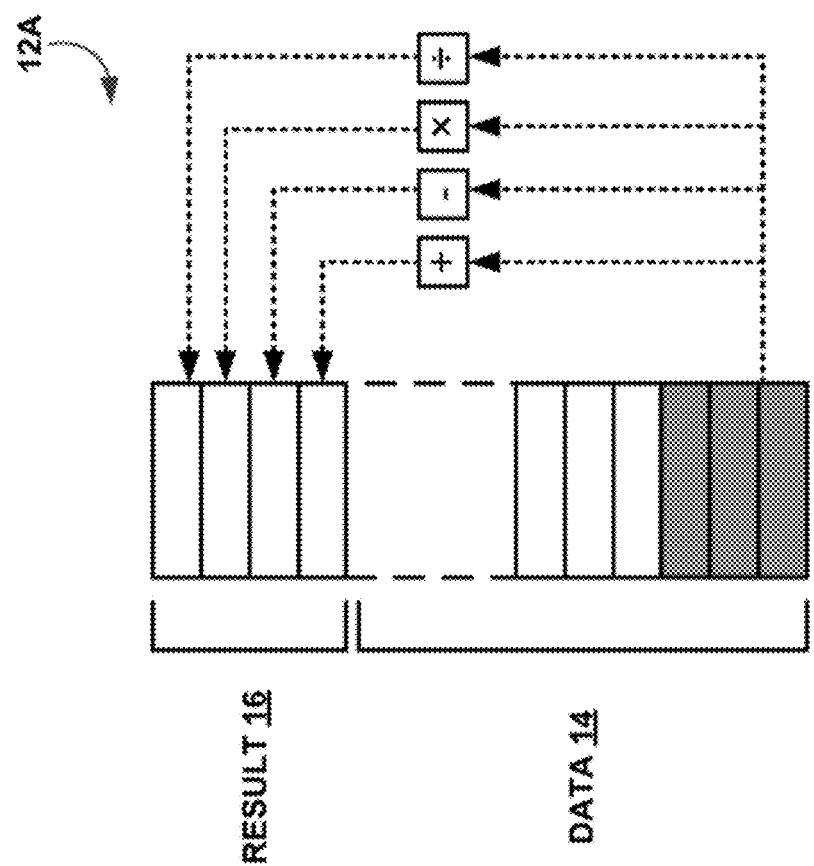
Figure 6A
*Figure 6*

```
< keyID_1; object ID_1; dpuID_1 >
< keyID_2; object ID_2; dpuID_2 >
< keyID_3; object ID_3; dpuID_3 >
< keyID_4; object ID_4; dpuID_4 >
< keyID_5; object ID_5; dpuID_5 >
< keyID_6; object ID_6; dpuID_6 >
< keyID_7; object ID_7; dpuID_7 >
< keyID_8; object ID_8; dpuID_8 >
                  •

•

•
< keyID_X; object ID_X; dpuID_X >
```

*Figure 12*

NEURAL NETWORKS USING DATA PROCESSING UNITS

BACKGROUND

Field

The present disclosure generally relates to a novel computing architecture utilizing non-volatile memory. More specifically, the present disclosure relates to methods, systems and devices for storing, accessing and manipulating data in non-volatile memory arrays supported by data processing units allowing for in-place computations.

Description of Related Art

Modern computing techniques use a centralized approach to processing data using a central processing unit (CPU) and transferring data back and forth from storage. This transfer of data for tasks such as retrieving information, storing calculated results, and in some cases verifying the results, is a noticeable bottleneck in a centralized processing approach to computer architecture. Additionally, a centralized computer architecture utilizes random-access-memory (RAM) to perform processes of an operating system (OS). In this methodology a CPU retrieves data from a storage device, performs operations on the data in RAM and then returns results to the storage device for persistent storage. Nonetheless, existing storage devices such as disk drives are relatively slow to read and write data. As computing systems evolve to implementation of data storage technology with faster read and write speeds, a centralized approach to computing will lead to data processing limitations.

SUMMARY

In some implementations, a computing system is provided. The computing system includes a device. The device includes a non-volatile memory comprising a plurality of memory sub-arrays. Each memory sub-array comprises a plurality of selectable locations. A plurality of data processing units are communicatively coupled to the non-volatile memory in the absence of a central processing unit of the computing system, and the data processing units are configured to access the non-volatile memory without the control of a central processing unit. The data processing unit is assigned to process data of a memory sub-array, and configured to store the first data object in the non-volatile memory receive a first data object via a communication interface. The first data object comprises a first content and is associated with a first set of keywords. The data processing unit is also configured to add the first set of keywords to a local dictionary. The local dictionary is stored in the non-volatile memory. The data processing unit is further configured to determine whether the first data object is related to one or more other data objects. The data processing units is further configured to create one or more relationships between the first data object and the one or more other data objects in response to determining that the first data object is related to one or more other data objects.

In some implementations, a computing system including a first device is provided. The first device includes a non-volatile memory comprising a plurality of memory sub-arrays. Each memory sub-array comprises a plurality of selectable locations. The non-volatile memory is configured to store a plurality of data objects. Each data object comprises content and is associated with one or more keywords. A plurality of data processing units are communicatively coupled to the non-volatile memory in the absence of a central processing unit of the computing system, including a data processing unit assigned to process data of a memory sub-array. The data processing unit is configured to receive a request to retrieve one or more data objects from a requestor. The request comprises a set of keywords. The data processing unit is also configured to determine whether any data objects stored in the non-volatile memory are a match for one or more keywords of the set of keywords based on a local dictionary. The local dictionary is stored in the non-volatile memory. The data processing unit is further configured to provide first data indicative of the first set of data objects to the requestor in response to determining that a first set of data objects are a match for one or more keywords of the set of keywords. The data processing units is further configured to determine whether any data objects stored in a non-volatile memory of a second device are a match for one or more keywords of the set of keywords based on a remote dictionary. The remote dictionary is stored in the non-volatile memory. The data processing unit is further configured to forward the request to the second device in response to determining that the one or more data objects are stored in the non-volatile memory of the second device.

In some implementations, a method is provided. The method includes storing the first data object in a non-volatile memory receive a first data object via a communication interface. The first data object comprises a first content and is associated with a first set of keywords. The non-volatile memory includes a plurality of memory sub-arrays. Each memory sub-array comprises a plurality of selectable locations. A plurality of data processing units are communicatively coupled to the non-volatile memory for memory access in the absence of a central processing unit of the computing system. The method also includes adding the first set of keywords to a local dictionary. The local dictionary is stored in the non-volatile memory. The method further includes determining whether the first data object is related to one or more other data objects. The method further includes creating one or more relationships between the first data object and the one or more other data objects in response to determining that the first data object is related to one or more other data objects.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 6A is a block diagram illustrating an example structure of a data line that may be included in a processor-in-non-volatile-storage-memory (PiNVSM) device according to one or more embodiments.

FIG. 6B is a block diagram illustrating an example structure of a code line that may be included in a PiNVSM device according to one or more embodiments.

FIG. 12 is a diagram illustrating an example preview of data objects according to one or more embodiments.

DETAILED DESCRIPTION

Figure 1:
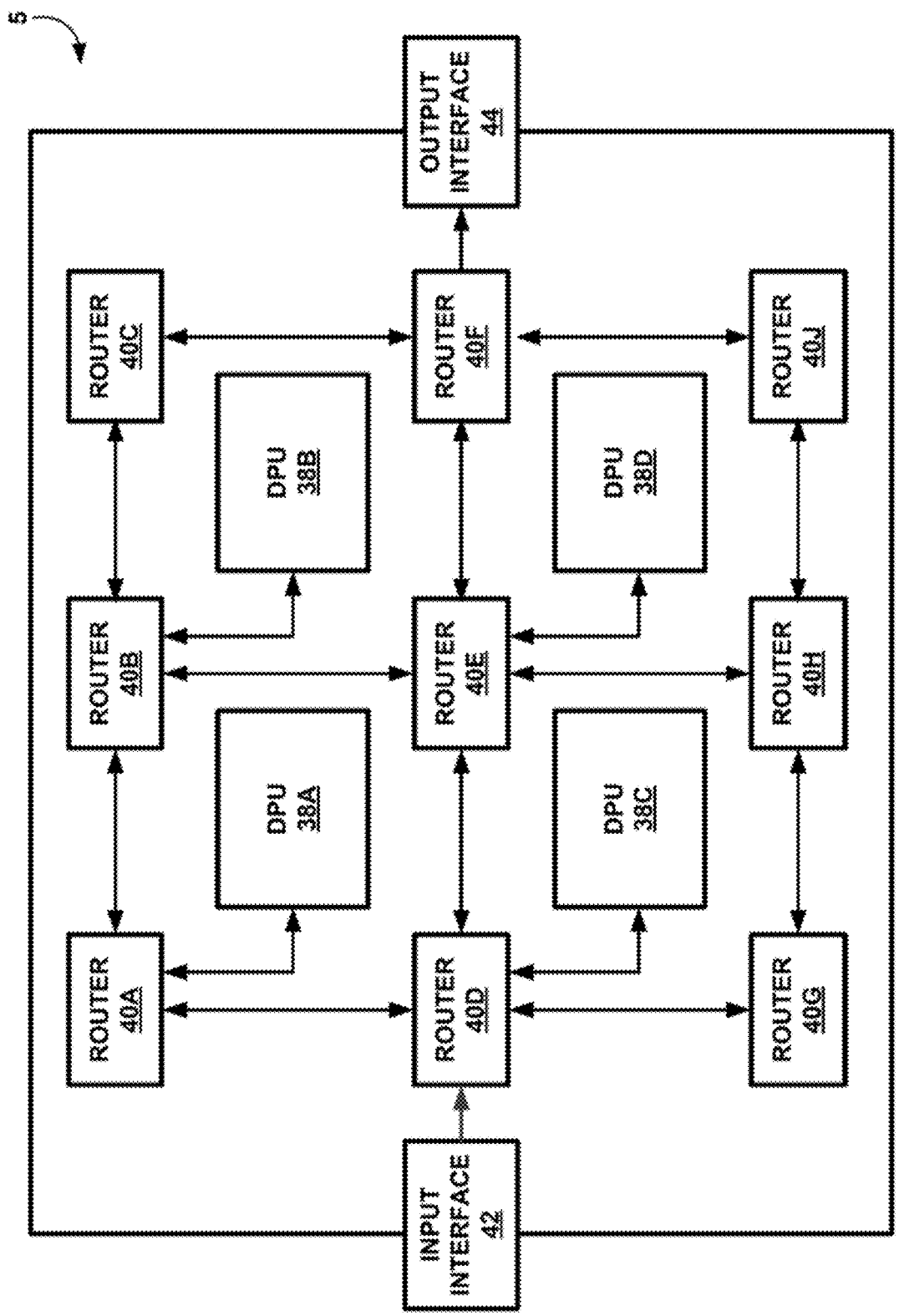
FIG. 1 is a block diagram illustrating an example computing system that includes a plurality of data processing units (DPUs) according to one or more embodiments.

While certain embodiments are described, these embodiments are presented by way of example only and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

The headings provided herein are for convenience only and do not necessarily affect the scope or meaning of the claimed invention. Disclosed herein are examples, implementations, configurations, and/or embodiments relating to restarting data processing units.

PiNVSM Computing Architecture Overview

In accordance with one or more embodiments, a computing architecture is disclosed in which a set of one or more processing units are each associated with a portion of persistent data storage and may process data in-place. For instance, a "processor-in-non-volatile-storage-memory" (PiNVSM) device on a semiconductor chip may be able to persistently store large amounts of data and to process the persistently stored data without the use of a central processing unit (CPU). In this example, as both the one or more processing units and the non-volatile storage memory (NVSM) are included on the same chip or packaging, the rate at which the one or more processing units may access data stored by the NVSM (i.e., latency) may be reduced. In some embodiments, a PiNVSM device may be implemented on a single semiconductor chip and may include a processing unit connected to an associated memory subarray of non-volatile memory. In some embodiments, a PiNVSM device may be implemented in a packaged module. A PiNVSM system may include a plurality of PiNVSM devices connected to each other in various configurations via various communication buses or channels (wired or wireless).

In some embodiments, one or more processing units of a PiNVSM device perform various mathematical and/or logic operations. In some embodiments, a PiNVSM device includes one or more arithmetic logic units (ALUs). For example, the ALUs may each be configured to perform integer arithmetic and logical operations (e.g., AND, NAND, OR, NOR, XOR, NOT). In some embodiments, the PiNVSM device may include one or more floating point units (FPUs), which may each be configured to perform non-integer calculations, such as division operations, which may generate a fraction, or a "floating point" number. In some examples, the PiNVSM device may include both one or more processing units (PU), and one or more field-programmable gate arrays (FPGAs). Processing units in some embodiments may be pre-fabricated in hardware to perform specific computations or data manipulations. For example, the processing units may be pre-fabricated with only specific circuit logic (such as ASICs) to perform a specific calculation. Alternatively, processing units may be programmable processing units that can be programmed dynamically to perform computations or data manipulations based on execution codes.

FIG. 1 is a block diagram illustrating an example computing system that includes a plurality of data processing units (DPUs) according to one or more embodiments. For the purpose of illustration, a PiNVSM device may, in some embodiments, be a single semiconductor chip and may include a processing unit connected to an associated memory subarray of non-volatile memory. As shown in FIG. 1, computing system 5 may include one or more data processing units (DPUs) 38A-38D (collectively, "DPUs 38"), one or more routers 40A-40J (collectively, "routers 40"), input interface 42, and output interface 44. In some examples, computing system 5 may be a standalone computing system where a separate host device is not present.

Input interface 42 may be configured to obtain input data. For instance, input interface 42 may obtain digital audio data, digital video data, text data (i.e., entered via keyboard), position data (i.e., entered via a mouse), and any other type of digital data. Output interface 44 may be configured to provide output data. For instance, output interface 44 may output digital audio data, digital video data, one or more management actions, and any other type of output data.

Routers 40 may each be configured to route data around computing system 5. In some examples, routers 40 may form a network on chip (NoC) architecture, such as the NoC architecture discussed in U.S. patent application Ser. No. 14/922,547 Titled "Fabric Interconnection for Memory Banks Based on Network-On-Chip Methodology" filed on Oct. 26, 2015 and/or U.S. patent application Ser. No. 14/927,670 Titled "Multilayer 3D Memory Based on Network-On-Chip Interconnection" filed on Oct. 27, 2015. As shown in FIG. 1, routers 40 may be interconnected via wires, traces, or any other conductive means. Routers 40 may route data and/or instructions around computing system 5. For instance, routers 40 may enable the transport/transfer/exchange of data and/or instructions amongst DPUs 38, input interface 42, and/or output interface 44. By enabling a NoC architecture, routers 40 may enable a reduction in a size of computing system 5 (i.e., as separate tracks between components may be eliminated).

DPUs 38 may each be configured to store and process data. DPUs 38 may each include a plurality of PiNVSM devices and as such, may include one or more processing units and a non-volatile memory array (NVMA) (e.g., comprising subarrays of non-volatile memory). For the purpose of illustration, a PiNVSM device may be a single semiconductor chip and may include one or more processing units connected to one or more associated memory subarrays of non-volatile memory.

Structure of a DPU

Figure 2:
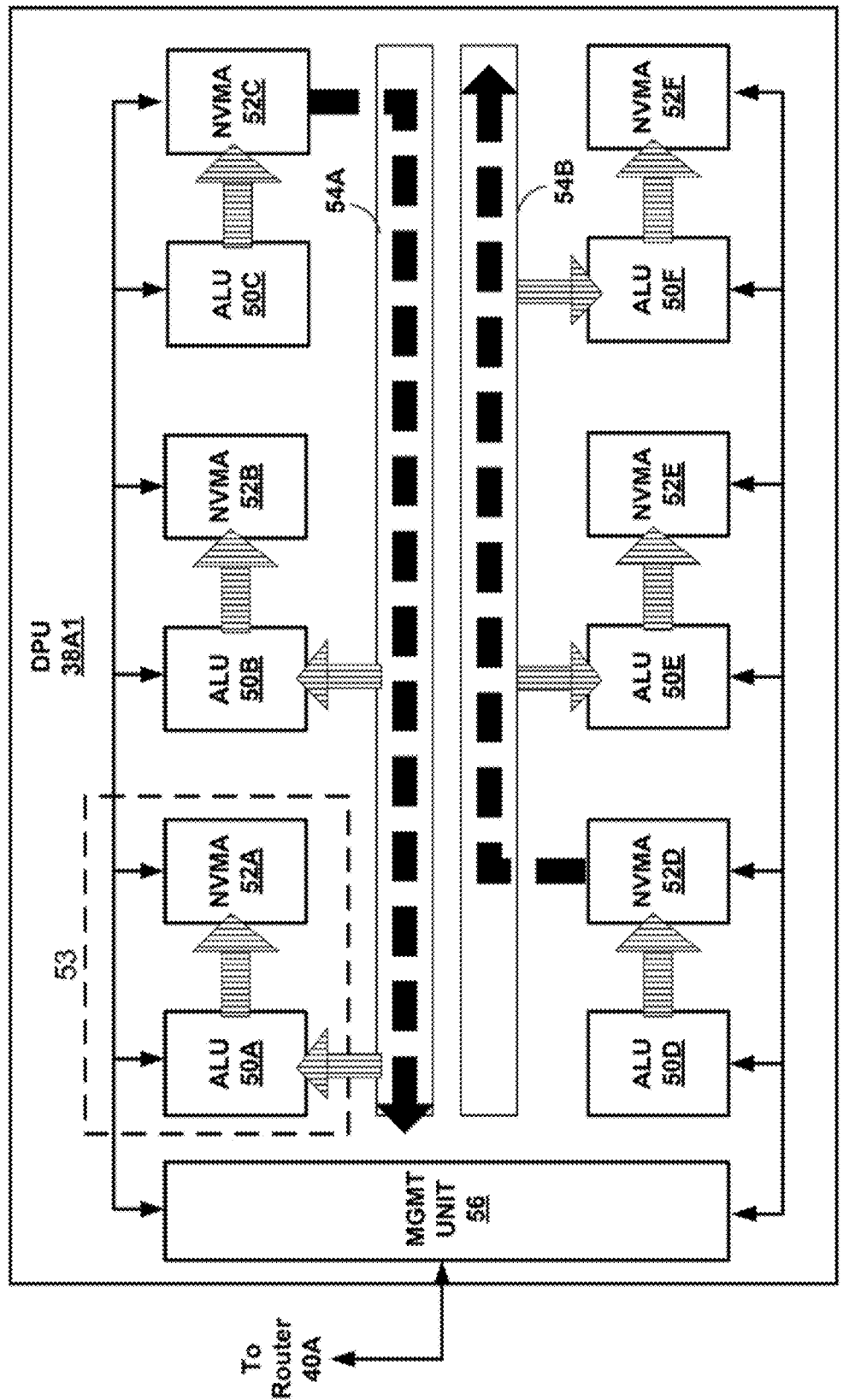
FIG. 2 is a block diagram illustrating an example data processing unit (DPU) according to one or more embodiments.

FIG. 2 is a block diagram illustrating an example data processing unit (DPU) according to one or more embodiments. DPU 38A1 in FIG. 2 may be an example of DPU 38A of FIG. 1. As shown in FIG. 2, DPU 38A1 includes arithmetic logic units (ALUs) 50A-50F (collectively, ALUs 50"), non-volatile memory arrays (NVMAs) 52A-52F (collectively, "NVMAs 52"), NVMAs 54A and 54B (collectively, "NVMAs 54"), and management unit 56. For the purpose of illustration, a PiNVSM device may be a single semiconductor chip and may include a processing unit (such as one of the ALUs 50A-50F) connected to an associated memory subarray of non-volatile memory (such as one of the NVMAs 52A-52F). For example, a PiNVSM device 53 may be represented by the dashed outline encompassing ALU 50A and NVMA 52A as shown in FIG. 2. Alternatively, a PiNVSM device may comprise a plurality of DPUs and a plurality of non-volatile memory sub-arrays of a collective non-volatile memory array, such as computing system 5 of FIG. 1.

Management unit 56 may be configured to control operation of one or more components of DPU 38A1. As shown in FIG. 2, management unit 56 may control operation of ALUs 50, NVMAs 52, and NVMAs 54. Management unit 56 may communicate with one or more components external to DPU 38A1, such as router 40A of FIG. 1.

NVMAs 52 may each represent an array of non-volatile memory that may be programmed and erased on the basis of selectable memory locations without altering data stored at other selectable memory locations. In some examples, NVMAs 52 may include any type of non-volatile memory device that may perform selectable memory location level programming and erasing without altering data stored at other selectable levels. For example, each bit in NVMAs 52 may be independently alterable without altering data stored in other bits in NVMAs 52. That is, NVMAs 52 may be configured to write a "0" or a "1" (or alter the storage state) of any single bit without changing any other accessible bit in normal operations. In some granularities, NVMAs 52 may be configured to be byte-wise alterable, word-wise alterable, double-word-wise alterable, quad-word-wise alterable, etc. This effectively allows the NVMAs 52 to have data overwritten in any granularity down to a single bit location, without the necessity of having to first "erase" an entire block of bits (as in traditional Flash Memory). In some examples, NVMAs 52 may be storage class memory. Some examples, of NVMAs 52 include, but are not limited to phase-change memory (PCM) devices, resistive random-access memory (ReRAM) devices, magnetoresistive random-access memory (MRAM) devices, ferroelectric random-access memory (FeRAM), holographic memory devices, and any other type of non-volatile memory devices capable of being written to at a location level without altering data stored at other selectable levels.

In some examples, NVMAs 52 and 54 may use multiple levels of granularity to access data (i.e., without the need to have fixed page sizes). For instance, in each of the selectable locations, NVMAs 52 and 54 may work with pages, without pages, with 4K, 6K, 18K, etc., blocks of data, or 64 bytes, 128 bytes, 256 bytes, etc. at a time. In some examples, an NVMA of NVMAs 52 and 54 may modify its internal organization on-the-fly. For instance, in each of the selectable locations, an NVMA of NVMAs 52 and 54 may change partitions, change banks organization, data line association, addressable area, accessible area, and/or blocks size.

NVMAs 54 may each represent an array of non-volatile memory that may be programmed and erased at the selectable location level without altering data stored at other selectable locations. In some embodiments, NVMAs 54 include non-volatile memory used as an execution conveyor and readily accessible by all other processing units and memory arrays of DPU 38A1.

ALUs 50 may be configured to manipulate data stored within NVMAs 52. For instance, each respective ALU of ALUs 50 may be configured to manipulate data within a corresponding NVMA of NVMAs 52. In the example shown in FIG. 2, ALU 50A may be configured to manipulate data within NVMA 52A, ALU 50B may be configured to manipulate data within NVMA 52B, and ALU 50F may be configured to manipulate data within NVMA 52F. In some examples, each ALU of ALUs 50 may be an elementary ALU.

The vertically shaded arrows in FIG. 2 may represent a management and execution flow amongst the components of DPU 38A 1. Similarly, the thick, solid arrows in FIG. 2 may represent instruction set flows amongst the components of DPU 38A1.

Figure 3:
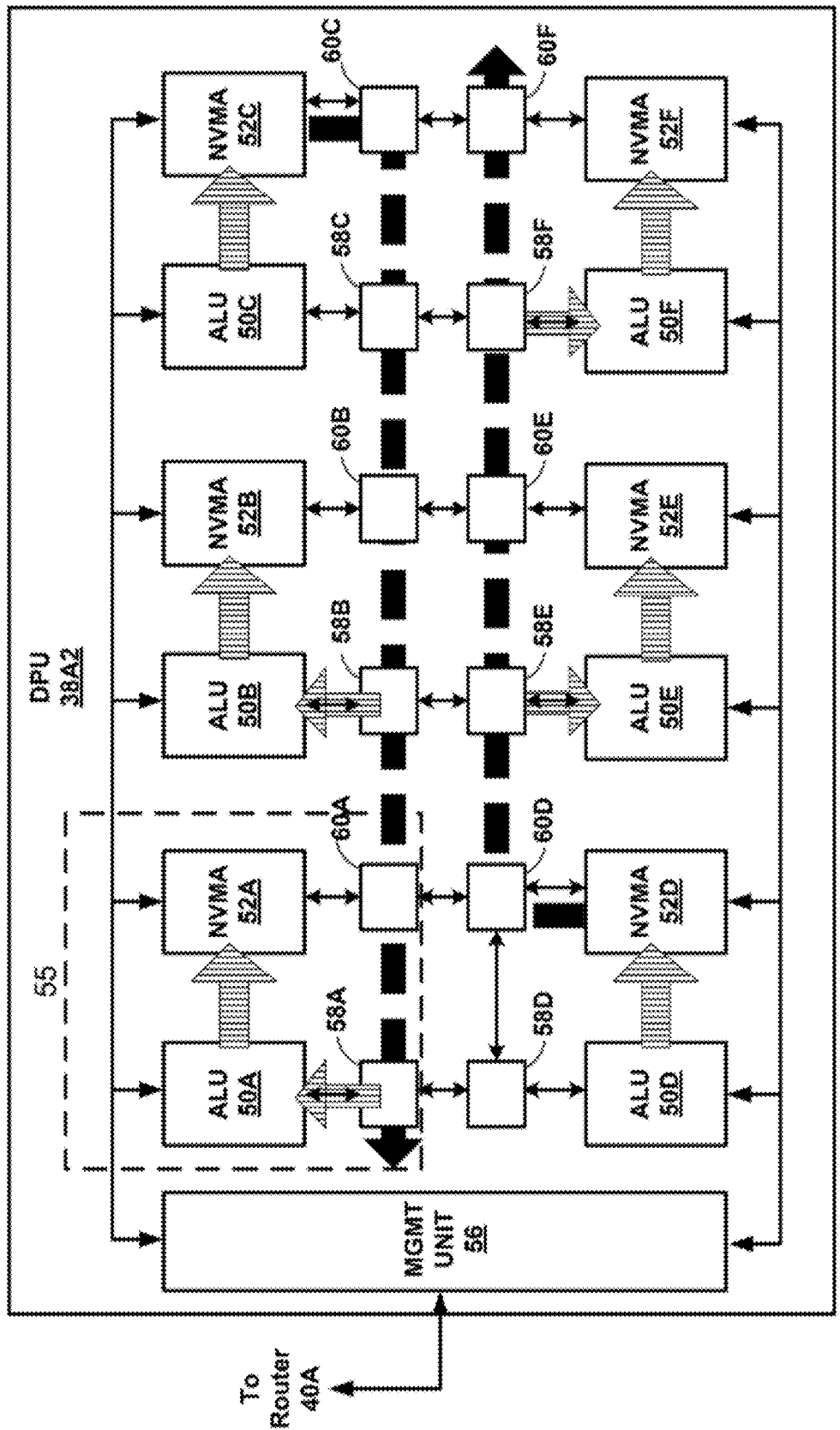
FIG. 3 is a block diagram illustrating another example data processing unit (DPU) according to one or more embodiments.

FIG. 3 is a block diagram illustrating another example data processing unit (DPU) according to one or more embodiments. DPU 38A2 in FIG. 3 may be another example of DPU 38A of FIG. 1. Similar to DPU 38A 1, DPU 38A2 includes ALUs 50, NVMAs 52, and management unit 56. In addition, DPU 38A2 includes a first plurality of routers 58A-58F (collectively, "routers 58"), and a second plurality of routers 60A-60F (collectively, "routers 60").

Routers 58 and routers 60 may function as a network-on-chip (NoC) within DPU 38A2 to move data amongst components of DPU 38A2. For instance, routers 58 and routers 60 may move data amongst ALUs 50 and/or NVMAs 52. In some examples, routers 58 and routers 60 may operate on different channels and/or different operating protocols and frequencies, according to different priorities.

Similar to the example of FIG. 2, the vertically shaded arrows in FIG. 3 may represent a management and execution flow amongst the components of DPU 38A2 and the thick solid arrows in FIG. 3 may represent instruction set flows amongst the components of DPU 38A2. In some embodiments, a PiNVSM device in this DPU format may include a processing unit (such as one of the ALUs 50A-50F) connected to an associated memory subarray of non-volatile memory (such as one of the NVMAs 52A-52F), as well as one or more routers (such as one of routers 58A-58F and/or routers 60A-60F). For example, a PiNVSM device 55 may be represented by the dashed outline encompassing ALU 50A and NVMA 52A, as well as router 58A and 60A as shown in FIG. 3. Alternatively, a PiNVSM device may comprise a plurality of DPUs and a plurality of non-volatile memory sub-arrays of a collective non-volatile memory array, such as computing system 5 of FIG. 1.

Storage Space in NVSM

Figure 4:
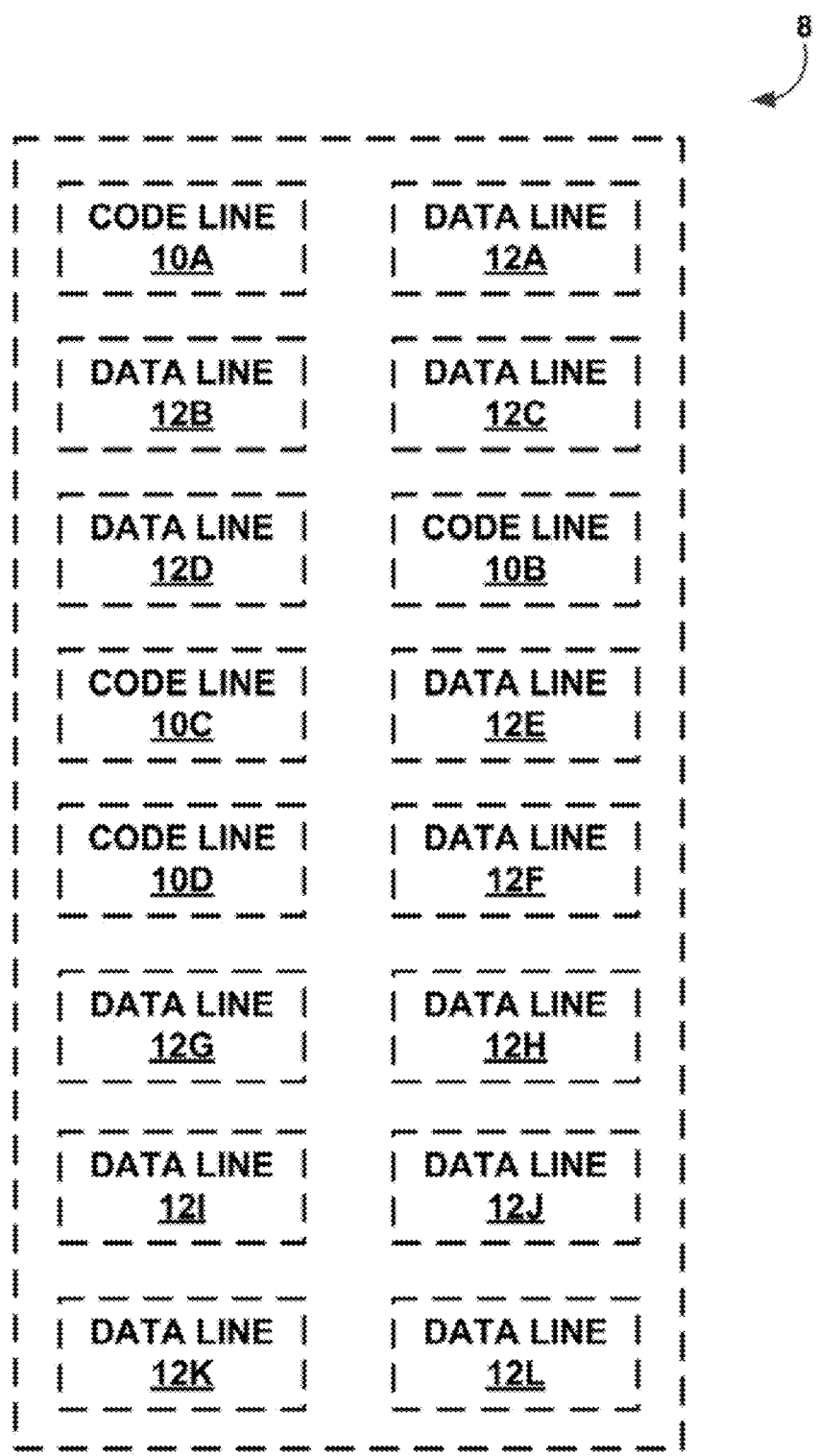
FIG. 4 is a block diagram illustrating an example storage space of a non-volatile memory storage device according to one or more embodiments.

FIG. 4 is a block diagram illustrating an example storage space of a non-volatile memory storage device according to one or more embodiments. In operation, processing units of DPUs (e.g., within one or more PiNVSM devices) may perform data manipulation based on data in selected locations of NVMA included in DPUs to generate corresponding results of the data manipulation. For instance, a processing unit may be configured to compute results for data in one or more associated data lines. As one example, a particular processing unit included in a DPU may be configured to compute results for data in a data line associated with the particular processing unit. The results of the computation may be stored in the associated data lines reserved for the results. Initial data used for the computation are only overwritten when specifically intended for overwrites. The processing units may cause NVMAs included in the DPUs to selectively program and erase data in selectable locations reserved to store results of the data manipulation based on the corresponding results. For instance, each of the processing units included in a DPU may be configured to selectively write, based on the corresponding results, data in a results portion of an associated data line.

In some examples, the processing units may perform the data manipulation based on instruction sets, such as execution code. In some embodiments, instruction sets are stored by DPUs as code lines. In some examples, the execution code in each of the code lines may contain a sequence of instructions. In some examples, a management unit may be configured to obtain the instruction sets.

As shown in FIG. 4, storage space 8 includes code lines 10A-10D (collectively, "code lines 10"), and data lines 12A-12L (collectively, "data lines 12"). In some embodiments, data lines 12 may each include some user data. For instance, each data line of data lines 12 may be an array of data items with associated operations. Also as discussed above, code lines 10 may each include an instruction set (i.e., a software primitive, execution code) that can be used for manipulation of user data of data lines 12. In other words, a code line of code lines 10 may be a sequence of operations with the prepared environment that can be used for transformation of user data of data lines 12.

In some examples, code may be simply stored as data and it can be treated as a data line. Otherwise, the code may be copied into a particular location (e.g., a special place or execution conveyor, for example) that will be treated as a sequence of instructions (code line 10). After being used to manipulate data, a code line of code lines 10 may be transformed in data line of data lines 12 that will store results of the data manipulation and/or executable code.

Figure 5:
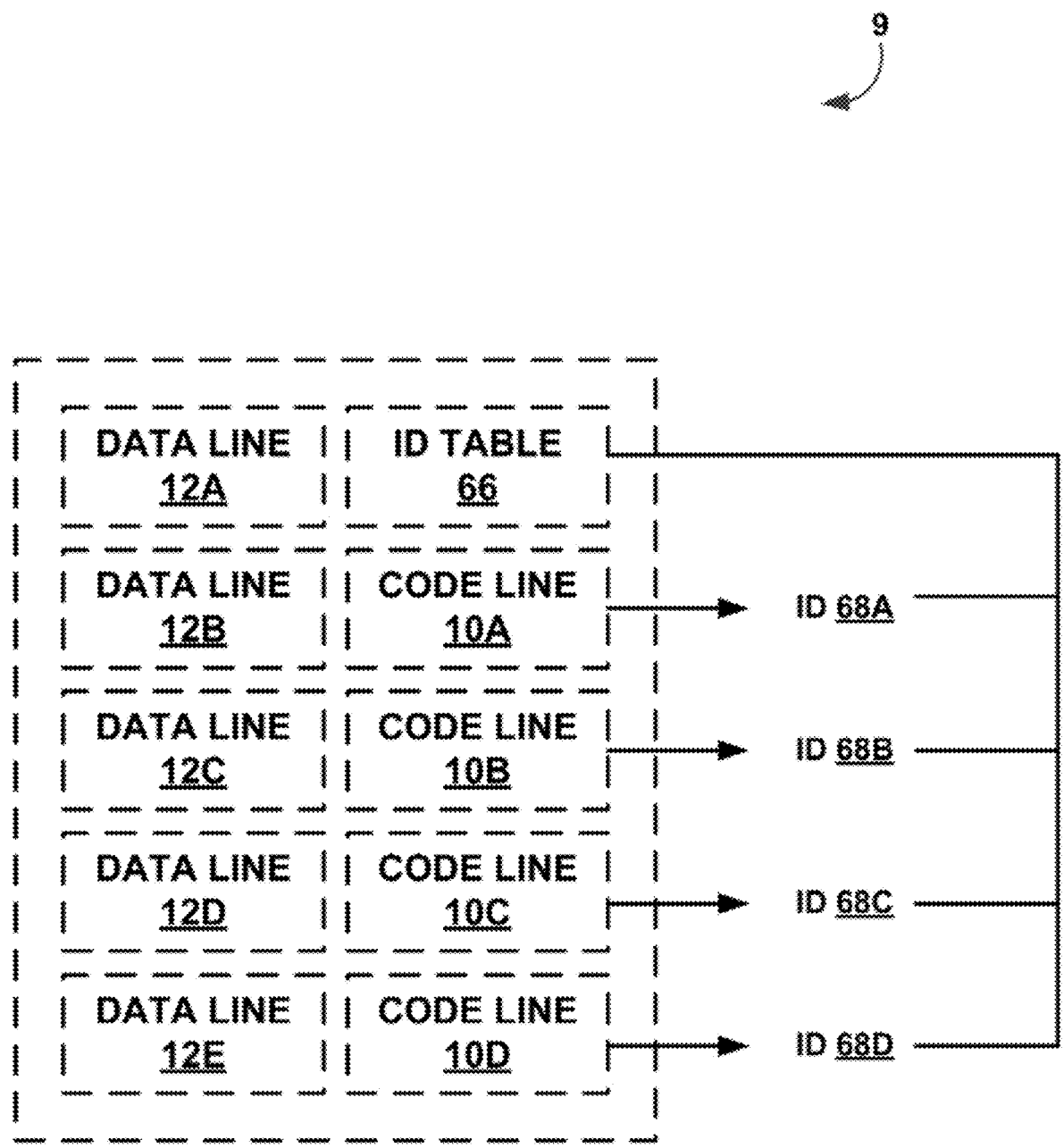
FIG. 5 is a block diagram illustrating another example storage space of a non-volatile memory storage device according to one or more embodiments.

FIG. 5 is a block diagram illustrating another example storage space of a non-volatile memory storage device according to one or more embodiments. As shown in FIG. 5, similar to storage space 8 of FIG. 4, storage space 9 includes code lines 10, and data lines 12. As also shown in FIG. 5, storage space 9 includes ID table 66.

ID table 66 may store an identification number of each instruction set (i.e., code line). For instance, ID table 66 may store a respective identification number of identification numbers 68A-68D (collectively, "IDs 68") for each of code lines 10A-10D. In some examples, each of IDs 68 may be an Inode ID, a globally unique identifier (GUID), or a hash value of the corresponding instruction set. For instance, ID 68A may be an Inode ID or a hash value of an instruction set included in code line 10A. In some examples, IDs 68 may be referred to as fingerprints of their corresponding instruction sets. In some examples, ID table 66 may be included in a hash table of a DPU, such as a DPU of DPUs 38 of FIG. 1.

FIG. 6A is a block diagram illustrating an example structure of a data line that may be included in a processor-in-non-volatile-storage-memory (PiNVSM) device according to one or more embodiments. In the NVSM, programming and erasing of data may be performed on the basis of a selectable memory location level. For instance, the NVSM may be divided into a plurality of selectable memory locations and the processing units may be able to program data or erase data at a particular selectable memory location of the plurality of selectable memory locations without altering data stored at other selectable memory locations of the plurality of selectable memory locations. Some examples of NVSM include, but are not necessarily limited to, magnetoresistive random-access memory (MRAM), ferroelectric random-access memory (FeRAM), NRAM, resistive random-access memory (ReRAM), Phase Change Memory (PCM), and Mott memory.

As shown in FIG. 6A, data line 12A includes data portion 14 and results portion 16. Data portion 14 may correspond to one or more selectable locations of a PiNVSM device that store data, such as one or more selectable locations of an NVMA of NVMAs 52 of FIG. 2. Results portion 16 may correspond to one or more selectable locations of the non-volatile storage device that store results of manipulation of data, such as data stored in data portion 14. Data line 12A may be a logical structure and the selectable locations of data portion 14 and/or results portion 16 may or may not be contiguously located (meaning, in other words, may or may not have sequential physical addresses). The selectable locations that correspond to data portion 14 and the selectable locations that correspond to results portion 16 may be considered to be grouped into data line 12A.

In some examples, the selectable memory locations may be addressable memory locations. For instance, each of the selectable memory locations may have a unique numerical address, and data associated with a particular addressable memory location may be accessed/read/written via a unique address of the particular addressable memory location. In some examples, data at a particular addressable memory location may be accessed/read/written via an access system.

In operation, one or more processing units of a PiNVSM device may perform data manipulation based on data in selected locations of non-volatile memory of the PiNVSM device, generate corresponding results of the data manipulation, and cause the non-volatile memory to selectively program and erase data in selectable locations reserved to store results of the data manipulation based on the corresponding results. As the programming and erasing of data may be performed at the selectable location level, the one or more processing units may cause the non-volatile memory to selectively program and erase data in selectable locations reserved to store results of the data manipulation without altering data stored at selectable locations other than the selectable locations reserved to store results of the data manipulation.

In some examples, the non-volatile memory space may be shared between data lines and code lines. In general, a data line may include user data. A code line may include an instruction set (i.e., a software primitive, execution code) that can be used for manipulation of data lines. Each of the data lines may include one or more selectable locations and may be associated with a processing unit. In other words, the selectable locations of the non-volatile memory may be grouped into a plurality of data lines. In some examples, at any given time, a particular selectable location may only be grouped into a single data line. As such, in some examples, the PiNVSM device may have a unique mapping between selectable locations and data lines (or code lines) such that a single selectable location is not included in two data lines (or two code lines) at the same time.

In some examples, the grouping of selectable locations into data lines may be adjustable over time. For instance, at a first time, a first group of selectable locations of a plurality of selectable locations may be associated with a particular data line that is associated with a particular processing unit. At a second time, a second group of selectable locations of the plurality of selectable locations may be associated with the particular data line. The second group of selectable locations may be different than the first group of selectable locations (i.e., include a selectable location not included in the first group and/or omit a selectable location included in the first group).

FIG. 6B is a block diagram illustrating an example structure of a code line that may be included in a PiNVSM device according to one or more embodiments. As shown in FIG. 6B, code line 10A includes code portion 18, heap portion 20, and stack portion 22. Code portion 18 may correspond to one or more selectable locations of a non-volatile storage device that store an instruction set (e.g., a software primitive) that may be used to manipulate data. Heap portion 20 and stack portion 22 may each correspond to one or more selectable locations of a non-volatile storage device respectively used as a heap and a stack during data manipulation. Code line 10 may be a logical structure and the selectable locations of code portion 18, heap portion 20, and/or stack portion 22 may or may not be contiguously located (meaning, in other words, that these portions 18-22 may or may not be stored to memory locations having have sequential physical addresses).

Networking of DPUs

Figure 7:
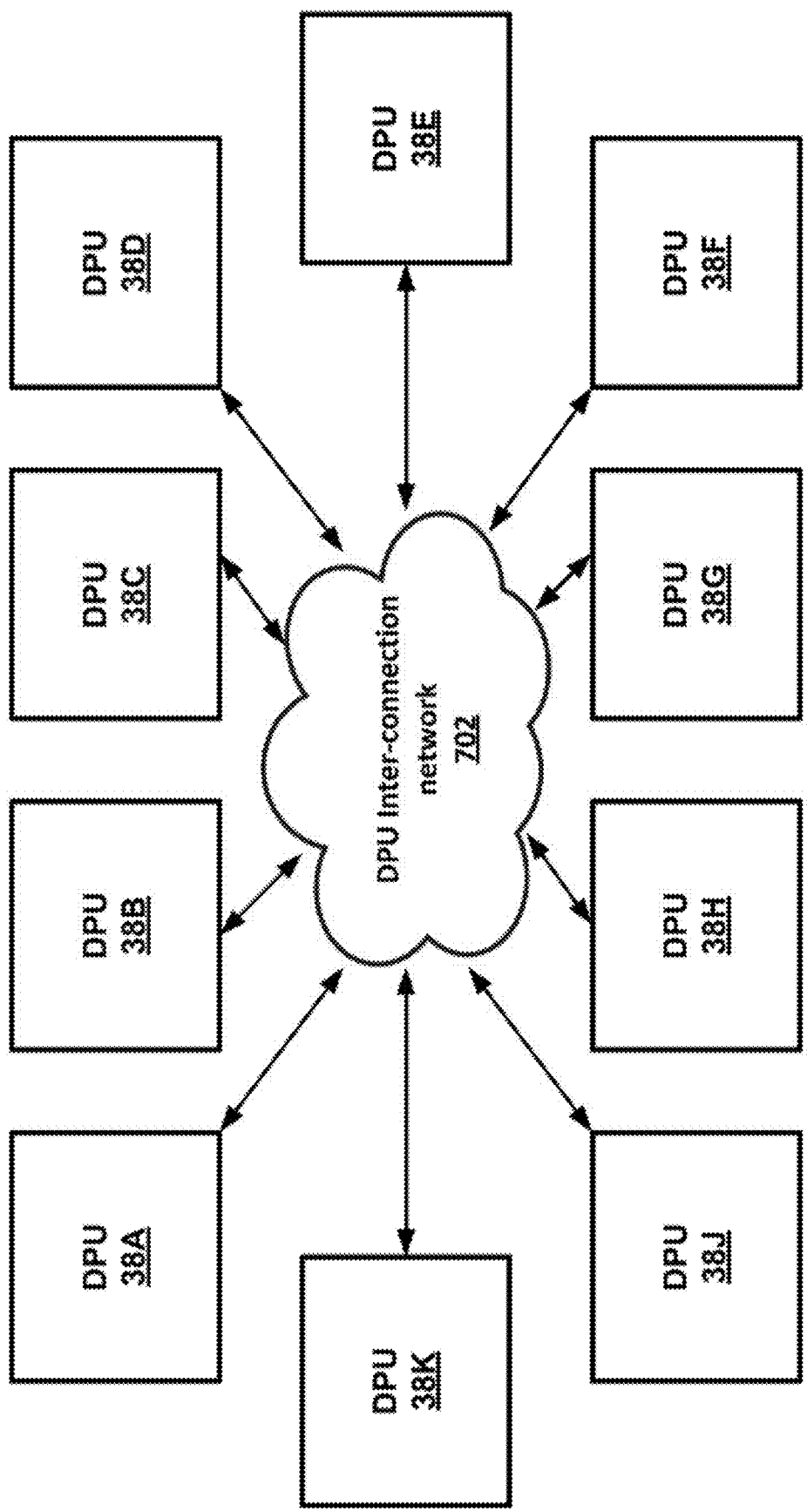
FIG. 7 is a block diagram illustrating an example networked structure of a set of data processing units according to one or more embodiments.

FIG. 7 is a block diagram illustrating an example networked structure of a set of data processing units according to one or more embodiments. As shown in FIG. 7, a set of one or more DPUs 38 (e.g., within a particular computing system, such as shown in FIG. 1), may be in communication with each other using a DPU inter-connection network 702. In some embodiments, network 702 is implemented by one or more routers, such as described above with reference to FIG. 1. In some embodiments, a DPU inter-connection network 702 is implemented within a computing system such as the one described with respect to FIG. 1.

In some embodiments, DPUs 38 may be directly interconnected via wires, traces, or any other conductive means. These conductive means may allow routing of data and/or instructions from one DPU 38 to another. For example, network 702 may be implemented by physical connections from a given DPU 38 (e.g., DPU 38G) to a sub-group of all the DPUs 38 in the network 702 (e.g., DPU 38G is connected to DPU 38H and DPU 38F). These sub-groups of connected DPUs 38 may effectively result in all DPUs 38 of a computing system having a link to the DPU inter-connection network 702. In some embodiments, a respective DPU 38 associated with (e.g., connected to) DPU inter-connection network 702 is configured to perform one or more functions of a router, such as transferring data and/or instructions from a first DPU to a second DPU. For example, DPU 38G may be physically connected to DPU 38I1 which may be physically connected to DPU 38J. In this example, DPU 38H may function as a router to transfer a set of instructions from DPU 38G to DPU 38J.

Figure 8:
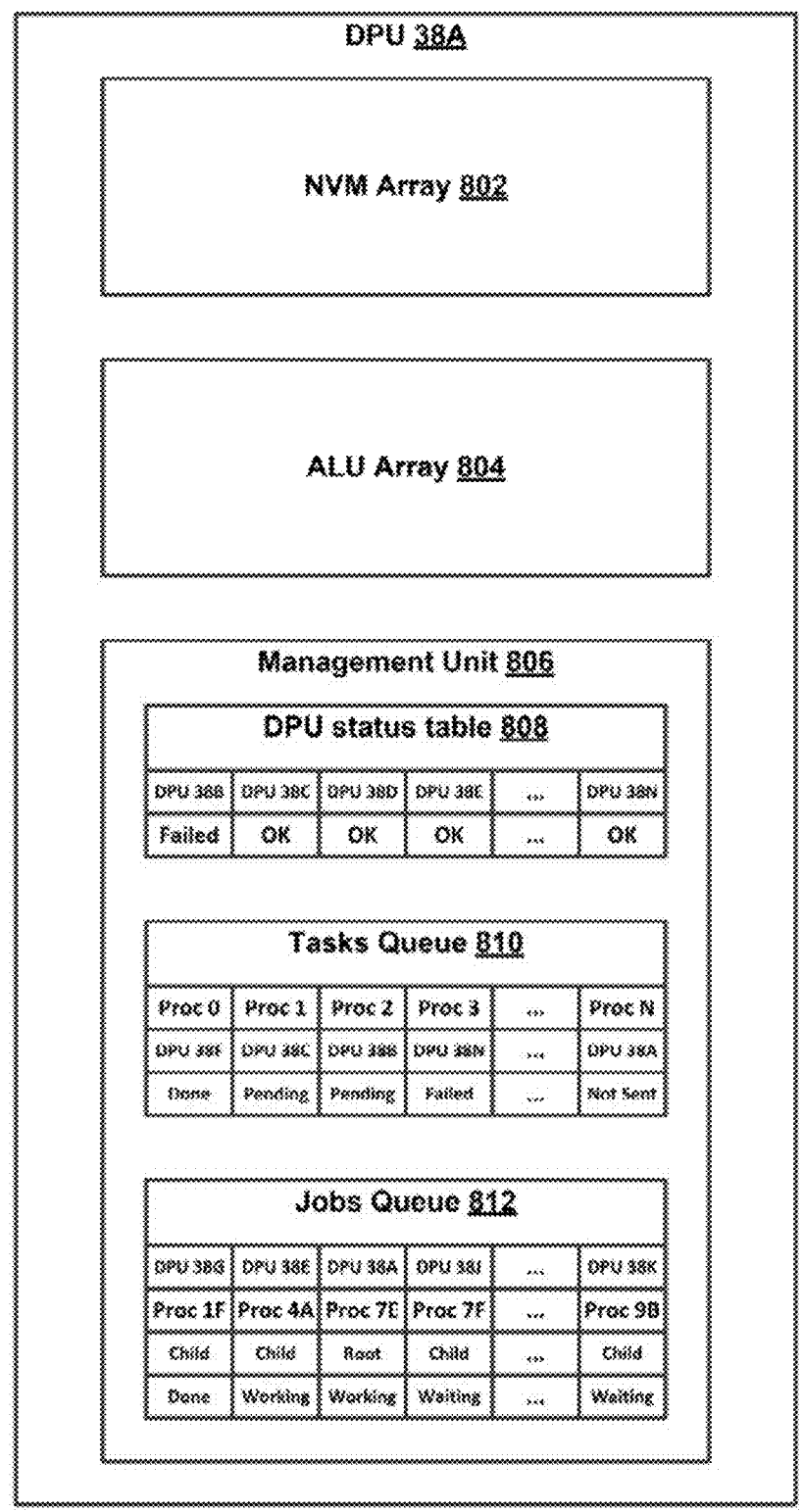
FIG. 8 is a block diagram illustrating an example structure of a management unit of a data processing unit according to one or more embodiments.

FIG. 8 is a block diagram illustrating an example structure of a management unit 806 of a data processing unit 38A, according to one or more embodiments. In this example, all the non-volatile storage of DPU 38A is abstracted to NVM Array 802. In some embodiments, NVM Array 802 comprises a plurality of non-volatile memory arrays, portions or sections, such as described above with respect to FIGS. 2 and 3. For example, DPU 38A may include a set of PiNVSM devices, each PiNVSM device of the set comprising a portion of non-volatile storage memory on-chip. Similarly, in some embodiments ALU Array 804 comprises a plurality of processing units and/or arithmetic logic units such as found on one or more PiNVSM devices of DPU 38A.

In some embodiments, a DPU such as DPU 38A includes a management unit 806. As described above with respect to FIGS. 2 and 3, a management unit 806 may be configured to control operation of one or more components of DPU 38A such as NVM Array 802 and/or ALU Array 804. In some embodiments, management unit 806 may communicate with one or more components external to DPU 38A, such as a router and/or other DPUs.

Management unit 806 of FIG. 8 is shown to include a DPU status table 808 and a tasks queue 810. In some embodiments, a DPU status table 808 includes information such as one or more identifiers (e.g., serial number, or a globally unique identifier (GUID)) for a respective DPU of the same DPU inter-connection network of which DPU 38A is a member. For example, DPU 38A is in a DPU inter-connection network (as described with respect to FIG. 7), with DPU 38B up to DPU 38N. In this example, there is at least one identifier for each of the other or "peer" DPUs of the DPU inter-connection network. In addition to an identifier, DPU status table 808 includes status information for the one or more peer DPUs of the DPU inter-connection network. For example, status information may indicate whether or not a peer DPU is "frozen" or unresponsive to communications from DPU 38A. In some embodiments, status information in DPU status table 808 may indicate a lack of received communication from a peer DPU of the DPU inter-connection network. For example, a particular DPU, such as DPU 38B may be indicated to have a status failure if DPU 38A does not receive a communication from DPU 38B within a predefined duration of time.

Tasks queue 810 illustrates an example of a listing of processes that will have corresponding instructions transmitted by management unit 806 to one or more DPUs of the DPU inter-connection network. In some embodiments, a tasks queue 810 includes one or more identifiers (e.g., serial number, an Inode ID, or a globally unique identifier (GUID)) for a respective process. In some embodiments, a respective process (e.g., process 0) is associated with a respective DPU of the DPU inter-connection network, including DPU 38A itself. Tasks queue 810 may have some identifying information for a respective DPU associated with a respective process in the queue. In some embodiments, a respective process in tasks queue 810 has an identifier related to the other processes in the queue. For example, the second process in tasks queue 810 of management unit 806 of DPU 38A may be labeled as "Process 1". In some embodiments, a respective process in tasks queue 810 has a globally unique identifier (GUID) or some other identifier that is specific to the process within the entire network of DPUs and the entire computing system.

Tasks queue 810 may also indicate the status of a respective process listed in the queue. For example, as shown in FIG. 8, a status of "Process 0" is listed as "Done," while a status of "Process 3" is listed as "Failed". In some embodiments a status is simply a binary flag indicating completion or not, while in some embodiments it is more qualitative. For example, "Process 1" is listed as "Pending" (e.g., in progress, working, incomplete, in process), while "Process N" is listed as "Not Sent" (i.e., instructions for Process N have not been sent to DPU 38A yet).

In some embodiments, processes in tasks queue 810 are child processes of one or more parent processes assigned to DPU 38A to complete. For example, a process in tasks queue 810 may be a derivative of a process in jobs queue 812. In some embodiments, jobs queue 812 is configured to list processes assigned to be completed by the DPU at which the jobs queue 812 resides. In the example shown in FIG. 8, jobs queue 812 corresponds to a list of processes assigned to be completed by DPU 38A. Jobs queue 812 may comprise identifying information pertaining to each respective process, such as a serial number, or a globally unique identifier (GUID)). Each process in jobs queue 812 may also have an associated and identified DPU, for instance a DPU from which instructions pertaining to the process were received, or pointers to such instructions were received. For example, "Process 7F" is a child process assigned to DPU 38A by DPU 38J. In some embodiments, a process in jobs queue 812 is further qualified by the nature of the process. In some embodiments a process can be a root process (e.g., an originating operating system process at the highest level of hierarchy), or a child process of a root or another process. In some embodiments, a process is added to the respective jobs queue 812 of a DPU by the DPU itself. For example, the DPU may add to its jobs queue 812, a child process of another (parent) process already assigned to the DPU.

In some embodiments, a jobs queue 812 also indicates the status of a respective process listed in the queue. For example, as shown in FIG. 8, a status of "Process 1F" is listed as "Done," while a status of "Process 7E" is listed as "Working". In some embodiments a status is simply a binary flag indicating completion or not, while in some embodiments it is more qualitative. For example, "Process 7E" is listed as "Working" (e.g., in progress, pending, incomplete, in process), while "Process 9B" is listed as "Waiting" (i.e., instructions for Process 9B have not been started at DPU 38A yet).

Figure 9:
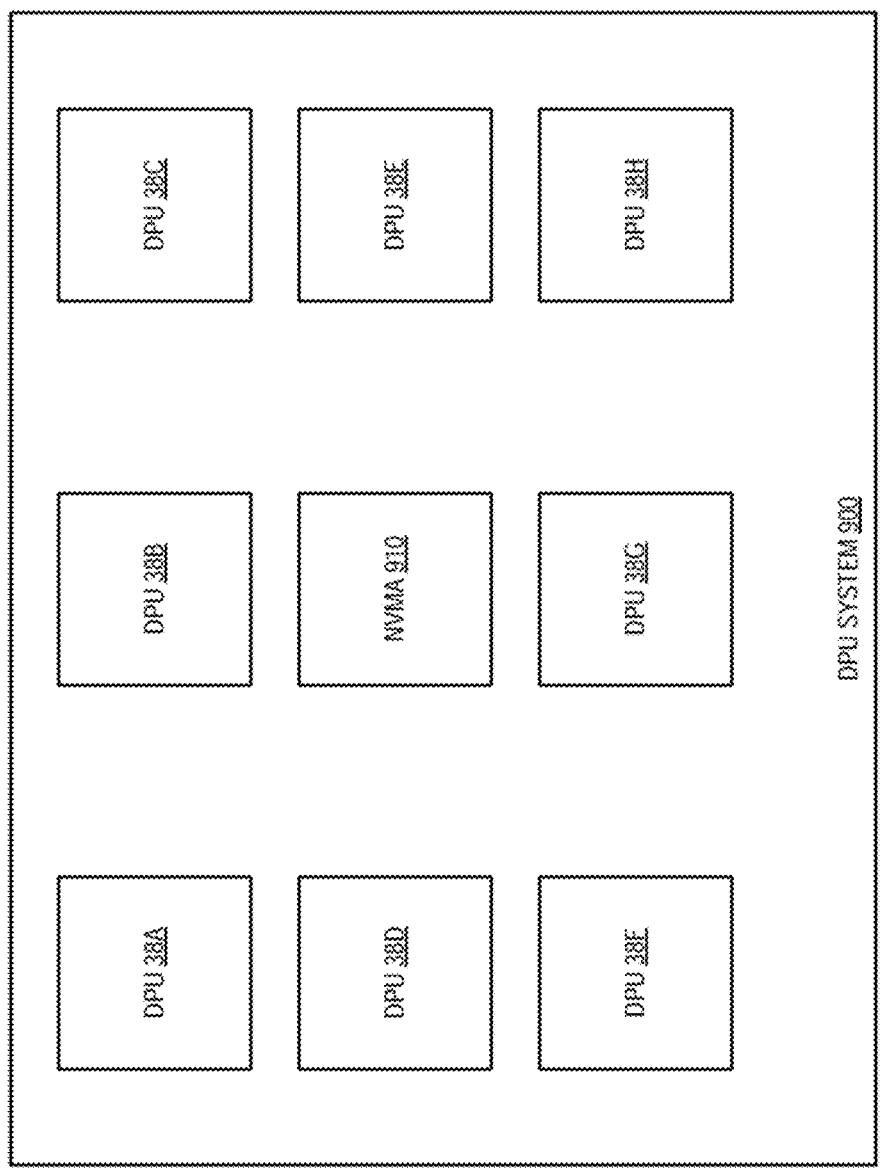
FIG. 9 is a block diagram illustrating an example system that includes a set of data processing unites according to one or more embodiments.

FIG. 9 is a block diagram illustrating an example DPU system 900 that includes a set of DPUs 38A through 38H according to one or more embodiments. The DPUs 38A through 38H (e.g., within a particular computing system, such as shown in FIG. 1), may be in communication with each other using a DPU inter-connection network, as discussed above. In some embodiments, the DPU inter-connection network is implemented by one or more routers, such as described above with reference to FIG. 1. In some embodiments, DPUs 38A through 38ll may be directly interconnected via wires, traces, or any other conductive means. These conductive means may allow routing of data and/or instructions from one DPU 38 to another. In some embodiments, a respective DPU 38 associated with (e.g., connected to) DPU inter-connection network is configured to perform one or more functions of a router, such as transferring data and/or instructions from a first DPU to a second DPU. The DPU system 900 also includes NVMA 910. The NVMA 910 may include subarrays of non-volatile memory. The NVMA 910 may be shared among the DPUs 38A through 38H. For example, instead including a NVMA in each DPU 38A through 38H, the NVMA 910 may be used by all of the DPUs 38A through 38H to read, write, or access data. In another example, the NVMA 910 the DPUs 38A through 38H may each include a NVMA and may also use the NVMA 910.

Figure 10:
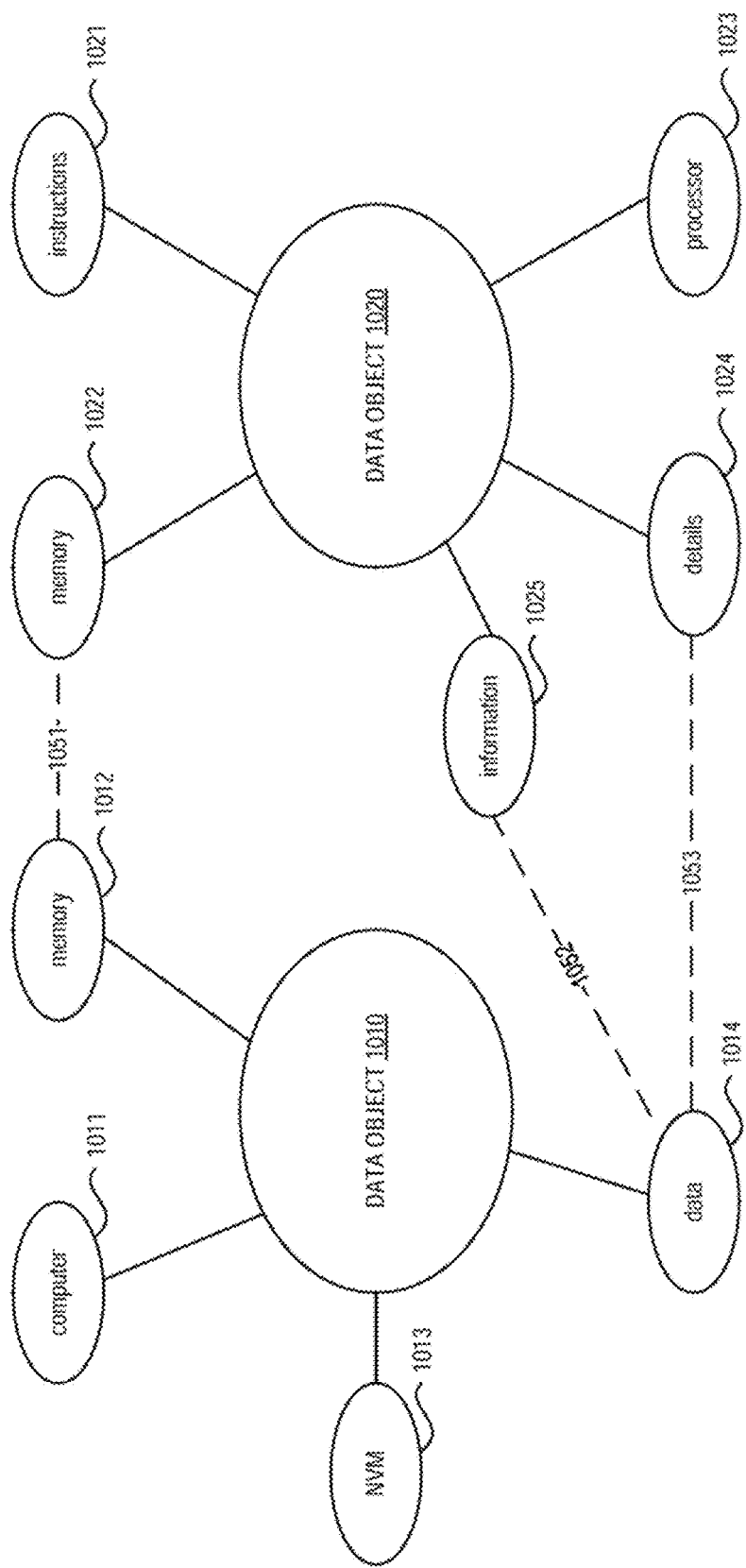
FIG. 10 is a diagram illustrating example data objects and relationships between data objects according to one or more embodiments.

FIG. 10 is a diagram illustrating example data objects and relationships between data objects according to one or more embodiments. A data object may be any type of data that is stored, accessed, and/or modified in the NMVs used by DPUs (e.g., DPUs 38 discussed above). For example, a data object may be a text file which includes alphanumeric text (e.g., words, sentences, paragraphs, etc.). In another example, a data object may be a digital image (e.g., a digital image, a digital picture, an image file, etc.). In a further example, a data object may be a digital video (e.g., a digital image, a digital picture, an image file, etc.).

A data object may include a set (e.g., one or more) keywords. For example, if the data object is a text file, the words in the text may be keywords. In another example, if the data object is a digital image, metadata indicating the content of the digital image (e.g., picture of a cat) may be a keyword. Alternatively or additionally, a data object may be associated with and/or characterized by the set of keywords. For example, a data object may be associated with various keywords and metadata indicating the various keywords may be provided to the DPUs along with the data object when the data object is stored in NVMs used by the DPUs.

In one embodiment, a keyword may be a primary keyword. A primary keyword may be a value (e.g., an alphanumeric string, a number, or some other appropriate value) that may defined by the content of the data object. For example, if the data object includes text, one or more of the words in the text may be a keyword. In another example, if the data object is a digital video, the scene or actors (e.g., names of the actors) depicted in the digital video may be primary keywords. Thus, a primary keyword may also include the content of a data object. A data object may include and/or may be associated with multiple primary keywords.

In another embodiment, a keyword may be an auxiliary keyword. An auxiliary keyword may also be referred to as a secondary keyword. An auxiliary keyword may be a keyword that may not be defined by the data object the auxiliary keyword is associated with, but may be defined by primary keywords of one or more other data objects. In some embodiments, because the primary keywords of the other data object are defined by the content of the other data object (e.g., the primary keyword of the other data object may include the content of the other data object), the auxiliary keyword of the data object may be defined by the content of the other data object. A data object may include and/or be associated with multiple auxiliary keywords.

In one embodiment, the keywords of a data object allow relationships to be created between data objects. For example, different keywords of different data objects may be related in various ways to create different relationships between the data objects. A relationship may be an association, correlation, connection, etc., between multiple data objects, based on keywords of the data objects. A relationship between two data objects may result in a logical connection or relation between different DPUs in a system. In one embodiment, a relationship may group, relate, connect, etc. two different objects together. This may allow a requestor to find data objects which may be related to a keyword. In another embodiment, a relationship may help define the meaning of a keyword of a first data object by using a keyword of another data object. This may also allow a requestor to find data objects which may be related to a keyword.

As discussed above, there may be different types of relationships between two data objects. In one embodiment, a relationship between two data objects may be an identity relationship. An identity relation may also be referred to as an identity relation or an identical relation. Two (or more) data objects may have an identity relationship with each other if are associated with identical keywords. For example, if a keyword of a first data object is identical or matches a keyword of the second data object, an identity relationship may be formed, created, etc., between the first data object and the second data object.

In another embodiment, a relationship between two data objects may be a synonymy relationship. A synonymy relationship may also be referred to as a synonymy relation or a synonymous relation. Two (or more) data objects may have a synonymy relationship with each other if they have keywords that have similar meaning. For example, if a keyword of a first data object has a meaning or definition similar to a keyword of the second data object, a synonymy relationship may be formed, created, etc., between the first data object and the second data object.

In another embodiment, a relationship between two data objects may be an antonomy relationship. An antonomy relationship may also be referred to as an antonomy relation or a antonomous relation. Two (or more) data objects may have an antonomy relationship with each other if they have keywords that have opposite meanings. For example, if a keyword of a first data object and a keyword of the second data object have opposing meanings of definitions, an antonomy relationship may be formed, created, etc., between the first data object and the second data object.

Two data objects 1010 and 1020 are illustrated in FIG. 10. The content of data objects 1010 and 1020 may include text (e.g., words, sentence, paragraphs, phrases, etc.). Data object 1010 is associated with keyword 1011 (e.g., the word "computer"), keyword 1012 (e.g., the word "memory"), keyword 1013 (e.g., the word "NVM"), and keyword 1014 (e.g., the word "data"). The keywords 1011 through 1014 may be word that included in the data object 1010 (e.g., are part of the text of data object 1010. Data object 1020 is associated with the keyword 1021 (e.g., the word "instructions"), keyword 1022 (e.g., the word "memory"), keyword 1023 (e.g., the word "processor"), keyword 1024 (e.g., the word "details"), and keyword 1025 (e.g., the word "information").

Three relationships (represented by the dashed lines between keywords) are also illustrated in FIG. 10. Relationship 1051 may be an identity relationship because keyword 1012 and keyword 1022 match (e.g., are identical). Relationship 1052 and relationship 1053 may be synonymy relationships because keywords 1024 and 1025 may be synonyms of keyword 1015 (e.g., keywords 1014, 1024, and 1025 may have similar meanings/definitions).

In one embodiment, the different types of relationships may be defined or indicated by a schema. For example, the schema may include a list of possible keywords and may indicate or define the types of relationships between the keywords. For example, if the data objects are text (e.g., sentences, paragraphs, etc.), a thesaurus may be used to defined synonymy and antonomy relationships. Various other types of schema may be used to define relationships between keywords in other embodiments.

In one embodiment, the relationships between the data objects in a DPU system may allow the DPU system to form a type of neural network that is based on relationships between data objects. As data objects are added into the DPU system the DPU system may create new relationships automatically based on the keywords associated with the new data objects and keywords associated with existing data objects. This may allow the neural network (implemented by the DPU system) to create a basis for organizing data and for generating or creating new knowledge (for creating new relationships between data objects), as discussed in more detail below.

Figure 11:
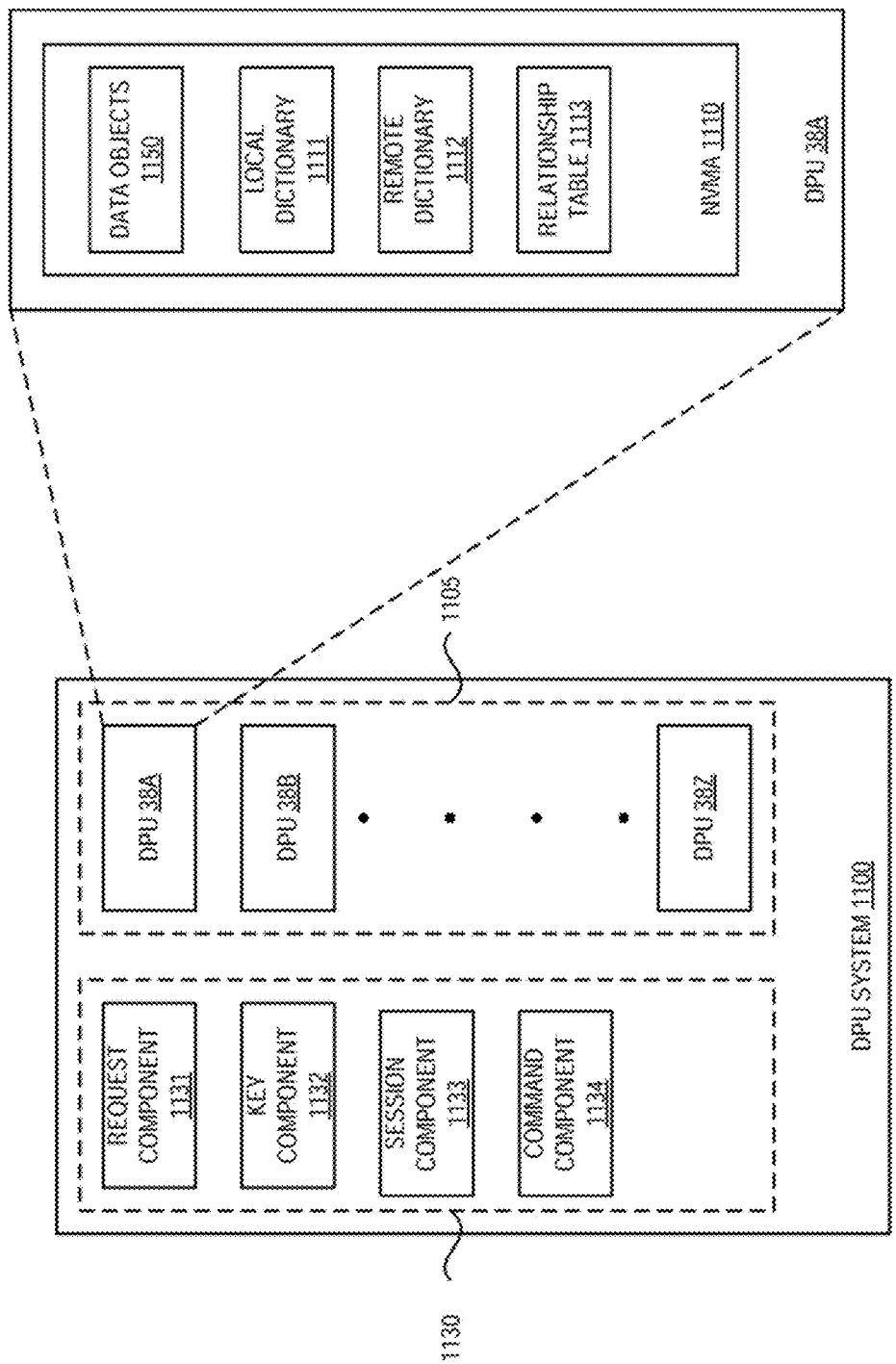
FIG. 11 is a block diagram illustrating an example system that includes data processing units according to one or more embodiments

FIG. 11 is a block diagram illustrating an example DPU system 1100 according to that includes one or more DPUs according one or more embodiments. The DPU system 1100 includes a DPU array 1105 and a management component 1130. The DPU array 1105 includes DPUs 38A through 38Z. The management component 1130 includes request component 1131, key component 1132, session component 1133, and command component 1134. In one embodiment, the management component 1130 may be and/or may include a DPU. For example, the functions, operations, actions, etc., performed by the management component 1130 may be performed by a DPU. Although DPU 38A is illustrated in more detail, the components of DPU 38A may be similar and/or identical to the components of DPUs 38B through 38Z.

The DPU system 1100 may be part of an artificial neural network that may track, manage, and/or create relationships between data objects. In one embodiment, the neural network may be a set of data objects that distributed between DPUs. The data objects may be aggregated or grouped together using relationships (e.g., logical relations), as discussed in more detail below. These relationships between the data objects may be created automatically when data objects are added to the DPU system 1100 (e.g., when data objects are stored in the DPU system 1100). This may allow the DPU system to create a basis for automatically organizing data and creating new knowledge (e.g., new relationships between data objects).

A request (e.g., another computing device) may store data objects in the DPU system 1100 without knowledge about other data objects inside of the DPU system 1100. As a result, DPU system 1100 (e.g., the neural network) may be able to discover identity/synonymy/antonomy relations of the keywords of newly added and existing data objects. These keywords may be the basis for creating and discovering relationships between data objects inside of the DPU system 1100. By aggregating or grouping data objects that are related to each other, new knowledge or information may be created by the DPU system 1100. Thus, the process of relations creation inside of the DPU system 1100 may be similar to a learning process because the DPU system 1100 creates new relationships that did not previously exist. This allows the DPU system 1100 to reveal or discover relationships between data objects that were not predicted or present beforehand. This learning process may be based on the principles of natural languages which may provide a human-readable way for creating knowledge and retrieving data objects.

As discussed above, the DPU system 1100 may be part of a neural network. A DPU can be similar to a neuron of a neural network and the DPU system 1100 may be a neural network. In some embodiments, the neural network may not include direct connections between different nodes, as in traditional neural networks (e.g., recurrent neural networks, convolutional neural networks, etc.). The neural network (e.g., DPU system 1100) may store data objects and/or keywords. The data and/or keywords are the basis for relationships between the data objects, as discussed above. The relationships may be logical connections between the data objects. The logical connections may be used by the DPU system 1100 to identify data objects that may be of interest to a requestor (e.g., another DPU system 1100 that is requesting data objects) based on keywords provided by the requested, as discussed in more detail below. The NVMA 1110 may store the data objects 1150 and/or keywords that may be associated with the data objects 1150. The keywords may be part of the data objects 1150 (e.g., may be included as part of the data objects) or may be stored separate from the data objects (e.g., may be store as separate metadata).

Each of the DPUs 38A through 38Z includes various data structures that may be used to track and/or manage data objects and/or relationships between data objects that are stored in the NVMA 1110. The various data structures may also be used to track and/or manage data objects and/or relationships between data objects that are stored in other DPUs and/or other DPU systems (e.g., in the NVMAs of other DPUs in other DPU systems). Local dictionary 1111, remote dictionary 1112, and relationship table 1113 are example data structures that may be used to track and/or manage data objects and/or relationships between data objects. As illustrated in FIG. 1, the local dictionary 1111, remote dictionary 1112, and relationship table 1113 are stored in the NVMA 1110 of a respective DPU.

In one embodiment, the local dictionary 1111 may store data indicating keywords associated with data objects 1150 that are stored on the NVMA 1110. For example, the local dictionary 1111 may be a table (e.g., a hash table) or a list that indicates which keywords are associated with which data object 1150. As discussed above, the keywords may be primary keywords or may be auxiliary keywords. Each entry in the local dictionary 1111 may include a keyword and one or more identifiers for one or more data objects 1150 that are associated with the keyword. For example, an entry may have the format {keyword; objectID_1, objectID_2. . . object ID_x}.

In one embodiment, the remote dictionary 1112 may store data indicating keywords associated with data objects 1150 that are stored on other DPUs or other DPU systems separate from DPU system 1100. For example, the remote dictionary 1112 may be a table (e.g., a hash table) or a list that indicates which data objects are stored on other DPU systems or DPUs. Each entry in the remote dictionary 1112 may include a keyword, an identifier for a data object stored in another DPU system/DPU, and an identifier for a DPU or the other DPU system. For example, an entry may have the format {keyword; objectID; dpuID/systemID}. This may allow the DPU system 1100 to know which other DPUS and/or systems may include data objects that a requestor may be interested in.

In one embodiment, the relationship table 1113 may include data indicating relationships between data objects 1150 stored in the NVMA 1110. For example, the relationship table 1113 may indicate that two data objects 1150 have an identity relationship. The relationship table 1113 may also include data indicating relationships between data objects 1150 stored in the NVMA 1110 and other data objects stored on other DPU systems or DPUs. For example, the relationship table 1113 may indicate that a data object 1150 has an identity relationship with another data object on another DPU system or DPU. Each entry in the relationship table 1113 may include identifiers for data objects and the type of relationship between the data objects. For example, an entry may have the format {relationshipType; objectID_1, objectID_2 . . . object ID_x}.

In one embodiment, the management component 1130 may manage, orchestrate, control, etc., the activity of the DPUs 38A through 38Z. For example the management component 1130 may receive requests to store data objects in the DPU system 1100 (e.g., in the NVMA 1110). The management component 1130 may assign the task of storing the data object in the NVMA 1110 to one or more of the DPUs 38A through 38Z. In another example, the management component 1130 may receive requests for data objects that match one or more keywords. The management component 1130 may assign the task of finding or searching for the data objects to one or more of the DPUs 38A through 38Z. The management component 1130 may also communicate with other DPU systems (which may include respective DPU arrays, management components, and NMVAs). For example, the management component 1130 may receive requests to search for data objects from other DPU systems that are included in the artificial neural network.

The request component 1131 may be coupled to other DPU systems and/or other devices (e.g., other computing devices) to receive requests. Requests that are received by the management component 1130 may include a command and one or more keywords. The requests may also include one or more data objects. The command may indicate what operation the requestor wants a DPU 38 to perform and/or execute. The keywords may be used to perform and/or execute the command. For example, a request may include a command to store a data object. The request may also include the data object and the keywords (e.g., primary and/or auxiliary keywords) associated with the data object. In another example, a request may include a command to search or retrieve data objects that match one or more keywords. The request component 1131 may also provide data and/or information to a requestor regarding the current state of a request. For example, a requestor (e.g., another DPU system) may transit a message to determine the current state of a request to store a data object in the DPU system 1100, and the request component 1131 may provide the current status or state of that request. The request component 1131 may also receive data objects and/or transmit data objects to requests. For example, if the request is store a data object, the request component 1131 may receive the data objet from the requestor. In another example, if the request is to retrieve data objects that match a keyword, the request component 1131 may transmit the data objects 1150 that match the keywords, to the requestor.

In one embodiment, the session component 1133 may generate and/or determine a session ID for a request. The session ID may be used by the DPU system 1100 and/or DPUs 38 to differentiate between different requests. The session component 1133 may also identify or determine which one of the DPUs 38A through 38Z should perform or execute the request (e.g., perform/execute a command in the request). For example, the session component 1133 may determine which DPUs 38A through 38Z are idle. In another example, session component 1133 may determine which DPUs 38A through 38Z have storage space in their respective NVMAs. The session component 1133 may store data indicating which sessions are allocated to which DPUs 38A through 38Z in a session table (not illustrated in the figures). For example, each entry in the session table may associate a session ID with an identifier for a DPU 38.

In one embodiment, the command component 1134 may analyze the request to determine the command that should be performed and/or executed. For example, the command component 1134 may analyze a request to determine whether the request is to store a data object or retrieve data objects. The command component 1134 may determine whether the request includes a recognized, correct, proper, etc. command. The command component 1134 may also determine whether the parameters for the command are correct. For example, if the command is to store a data object into the DPU system 1100, but the request does not include a data object, the command component 1134 may determine that there is an error in the command and/or request. The command component 1134 may send the command to the DPU 38 identified by the session component 1133. In some embodiments, the session component 1133 may not identify a DPU 38 and the command component 1134 may identify the DPU 38 that will execute/perform a command. The command component 1134 may also maintain a queue, buffer, etc., for the commands that are received by the DPU system 1100. For example, the command component may receive multiple requests from multiple requestors, such as multiple other DPU systems, and may add the commands indicated by the multiples requests into the queue.

In one embodiment, the key component 1132 may determine whether the DPU system 1100 includes data objects that are associated with one or more keywords. For example, when a data object is stored to the DPU system 1100 (e.g., within the NVMAs 1110 of the DPUs 38A through 38Z), the key component 1132 may determine whether the one or more keywords are already in the local dictionaries 1111 of the DPUs 38Z through 38Z. If the one or more words are in the local dictionary 1111, the key component 1132 may update an entry or add an entry to include the new data object and associate the new data object with the one or more keywords in the local dictionary 1111. In another example, if a request to retrieve data objects that are associated with a set of keywords is received, the key component 1132 may analyze the local dictionary 1111 and the remote dictionary 1112 to determine whether the local dictionary 1111 and the remote dictionary 1112 include keywords that match any of the keywords in the set of keywords.

As discussed above, a requestor (e.g., another DPU system, another computing device, etc.) may transmit a request to store one or more data objects in the DPU system 1100. The request may include the one or more data objects (to be stored in the NVMA 1110), a command (e.g., a store command), and keywords associated with the one or more data objects. In one embodiment, the management component 1130 (e.g., one or more of the request component 1131, the key component 1132, the session component 113, and the command component 1134) may identify one of the DPUs 38A through 38Z. For example, the management component 1130 may identify a DPU that may have enough space in its NVMA to store the one or more data objects. In another example, the management component 1130 may identify a DPU that may be idle and/or is available to store the one or more data objects.

In one embodiment, the management component 1130 may determine whether to add the keywords (received with the request to store the one or more data objects) to a local dictionary 1111 of one of the DPUs 38A through 38Z. For example, the management component 1130 may determine whether the keywords are already in a local dictionary 1111 of one of the DPUs 38A through 38Z. If the keywords are already in the local dictionary 1111 of one of the DPUs 38A through 38Z, the management component 1130 may update the entry with those keywords to include the new data objects that are being stored. If the keywords are not in the local dictionary 1111 of one of the DPUs 38A through 38Z, the management component 1130 may add an entry with the keywords and identifiers for the new data objects, to the local dictionary 1111 of one of the DPUs 38A through 38Z.

In some embodiments, a DPU 38 may perform the above operations, instead of the management component 1130. For example, DPU 38Z may add the keywords to its local dictionary 1111.

In one embodiment, the management component 1130 may also analyze the keywords in the local dictionaries 1111 of the DPUs 38A through 38Z to determine whether the new data objects that are being stored, are related to other data objects. For example, the management component 1130 may analyze the keywords of the new data objects and the keywords of the other data objects 1150 in the NVMA of DPU 38A to determine whether there are synonymy relationship, antonomy relationships, and/or identity relationships. If any of the new data objects are related to existing data objects 1150, the management component 1130 may update the relationship table 1113 of DPU 38A, as discussed in more detail below.

In one embodiment, the management component 1130 may also analyze the keywords in the remote dictionary 1112 of one of the DPUs 38A through 38Z to determine whether the new data objects that are being stored, are related to other data objects in other DPU systems and/or DPUs. For example, the management component 1130 may analyze the keywords of the new data objects and the keywords of the other data objects to determine whether there are synonymy relationships, antonomy relationships, and/or identity relationships. If any of the new data objects are related to other data objects in other DPU systems or DPUs, the management component 1130 may update the relationship table 1113, as discussed in more detail below.

In one embodiment, the management component 1130 may transmit a request to other DPUs in the DPU system 1100 if the new objects are not related to data objects indicated in the local dictionary 1111 of one DPU. For example, the management component 1130 may transmit a request to DPU 38B if the new objects are not related to data objects indicated in the location dictionary 1111 of DPU 38A. This may allow the management component 1130 to determine whether other DPUs in the DPU array 1105 have objects that may be related to the new objects. In some embodiments, the management component 1130 may also transmit a request to other DPU systems (e.g., a separate system with a separate DPU array) to determine if the new objects are related to other data objects stored in the other DPU systems.

In one embodiment, the management component 1130 may create relationships between data objects. For example, a keyword of a new data object may be associated with a keyword of an existing data object 1150 in DPU 38A. The management component 1130 may update a relationship table 1113 of DPU 38A to indicate that the new data object and the existing data object 1150 are related (e.g., have a synonymy, antonomy, or identity relationship). In another example, a keyword of a new data objet may be associated with a keyword of a keyword of an existing data object 1150 in DPU 38B. The management component 1130 may update a relationship table 1113 of DPU 38A to indicate that the new data object is related to a data object 1150 on DPU 38B (e.g., have a synonymy, antonomy, or identity relationship). The management component 1130 may also update the relationship table 1113 of DPU 38B to indicate that the data object 1150 on DPU 38B is related to the new data object stored on DPU 38A.

In one embodiment, the management component 1130 may receive a request for data objects that are associated with one or more keywords. For example, the request may be a command to retrieve, find, identify, etc., one or more data objects that are associated with a set of keywords provided by the requestor (e.g., provided in the request). The management component 1130 may check the local dictionaries 1111 of the DPUs 38A through 38Z to determine whether any data objects in the DPU system 1100 match one or more of the set of keywords. The request may also include an ordering or conditions for the set of keywords (e.g., logical conditions or logical ordering). For example, the request may indicate that data objects that match both a first keyword and a second keyword should be retrieved, identified, etc. In another example, the request may indicate that data objects that match a first keyword or a second keyword should be retrieved, identified, etc.

In some embodiments, the management component 1130 may forward the keywords to the DPUs 38A through 38Z, and the DPUs 38A through 38Z may check their respective local dictionaries 1111. For example, each DPU 38A through 38Z may receive the set of keywords from the management component 1130 and each DPU 38A through 38Z may check their respective local dictionaries 1111. Each DPU 38A through 38Z may also check their respective remote dictionaries 1112 to determine if data objects on other DPUs are associated with keywords that match the requested keywords. If a DPU determines that there is a keyword in a remote dictionary 1112 that matches a requested keyword, the management component 1130 may forward the request to the DPUs identified in the remote dictionary 1112 which have data objects associated with keywords that match the requested keywords.

In one embodiment, the management component 1130 may generate data indicating one or more data objects that are associated with keywords that match one or more requested keywords (e.g., keywords provided by the requestor). For example, the management component 1130 may generate a list, a table, etc., of object identifiers for data objects that are associated with keywords that match one or more requested keywords, as discussed in more detail below. The data indicating one or more data objects that are associated with keywords that match one or more requested keywords may be referred to as a preview or a view.

In one embodiment, the management component 1130 may select, identify, etc., some or all of the data objects that are associated with keywords that match one or more requested keywords, and may provide (e.g., transmit) those data objects to the requestor. For example, the management component 1130 may analyze all of the data objects that are associated with keywords that match one or more requested keywords. From those data objects, the management component 1130 may select data objects that have a threshold number of relationships with other data objects (e.g., select data objects that have at least three, ten, or some other appropriate number of relationships). Alternatively or additionally, the management component 1130 may also select the data objects that have the most relationships with other data objects. For example, the management component 1130 may select the top five, ten, etc., data objects that have the most relationships with other data objects.

In one embodiment, the management component 1130 may determine the times when each of the data objects that are associated with keywords that match one or more requested keywords, were stored in the DPU system 1100. For example, the management component 1130 may analyze a timestamp for each of the of the data objects that are associated with keywords that match one or more requested keywords. The management component 1130 may select a subset of the data objects which have a timestamped later than a threshold timestamp. For example, the management component 1130 may select the data objects which were stored in the DPU system 1100 within the last week, two weeks, three months, etc. Alternatively or additionally, the management component 1130 may select the data objects with the latest timestamps. For example, the management component 1130 may select the data objects with the latest five, ten, or some other appropriate number of timestamps In one embodiment, the management component 1130 may receive input (or other data) from the requestor indicating a set of data objects to retrieve. For example, the management component 1130 may provide a preview of the data objects that are associated with keywords that match one or more requested keywords, to the requestor. The requestor may transmit or provide input indicating one or more of the data objects. The management component 1130 may retrieve the indicated data objects and may provide those data objects to the requestor.

FIG. 12 is a diagram illustrating an example preview 1200 of data objects according to one or more embodiments. As discussed above, a requesting (e.g., a computing device) may transmit a request to a DPU system (e.g., DPU system 1100 illustrated in FIG. 11) for one or more data objects associated with keywords that match one or more requested keyword. The DPU system may analyze local dictionaries and/or remote dictionaries of the DPUs in the DPU system to determine whether data objects in the DPU system are associated with keywords that match one or more of the requested keywords.

Also, as discussed above, the DPU system may generate a preview of the data objects associated with keywords that match one or more requested keyword. For example, the management component may generate preview 1200. Preview 1200 may be a list of keywords, data objects associated with the keywords, and identifiers for DPUs that may store the keywords. For example, each line or row of the preview 1200 has the following format <keyID_#; objectID_#; dpuID__#>. keyID_# may represent a keyword. objectID_# may represent an identifier for a data object that is associated with the keyword. dpuID_# may represent an identifier for a DPU where the data object is stored. In some embodiments, the information in preview 1200 may be represented using different formats or notations. For example, each line or row may include a keyword, multiple identifiers for multiple data objects that are associated with the keyword, and multiple identifiers for DPUs where the multiple data objects are stored.

Figure 13:
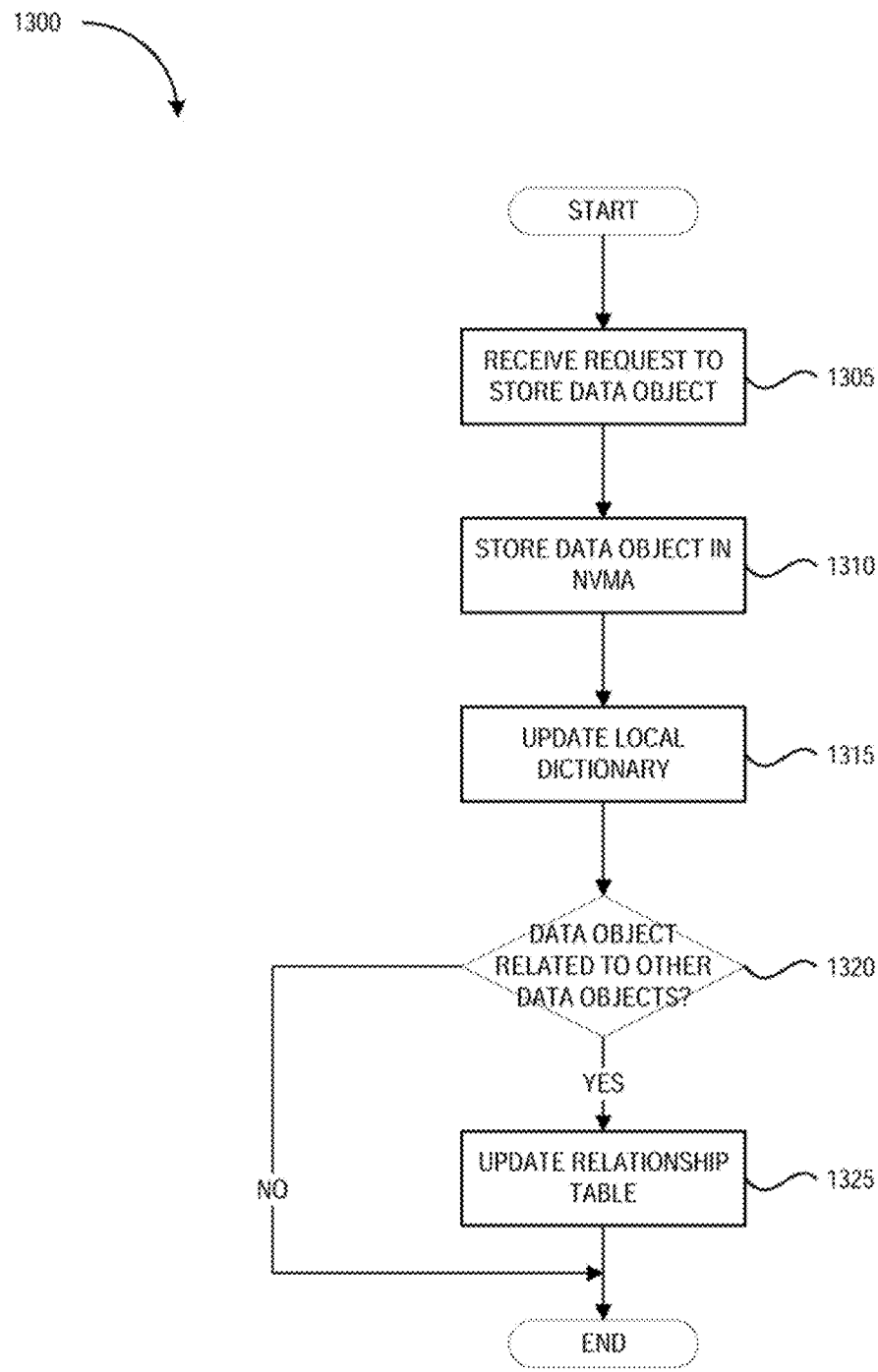
FIG. 13 is a flowchart illustrating an example a method for storing one or more data objects in a data processing unit system in accordance with one or more embodiments.

FIG. 13 is a flowchart illustrating an example a method 1300 for storing one or more data objects in a DPU system (e.g., DPU system 1100 illustrated in FIG. 11), in accordance with one or more embodiments. The method 1300 may be performed by a DPU (e.g., DPU 38 illustrated in FIG. 11), a management component (e.g., management component 1130 illustrated in FIG. 11), a DPU system, etc. The DPU, DPU system, and/or management component may be processing logic that includes hardware (e.g., circuitry, dedicated logic, programmable logic, microcode, etc.), software (e.g., instructions run on a processor to perform hardware simulation), firmware, or a combination thereof.

The method 1300 begins at block 1305 where the method 1300 receives a request to store a data object in the DPU system. As discussed above, the request may be received from another DPU system and/or another computing device (e.g., from a requestor). At block 1310, the method 1300 may store the data object in the NVMA of a DPU in the DPU system. For example, the method 1300 may store the data objet in the NVMA of a DPU with enough free space to store the data object. The method 1300 may update the local dictionary of the DPU where the data objet was stored. For example, the method 1300 may add an entry to the local dictionary or may update an entry of the local dictionary, as discussed above.

At block 1320, the method may determine whether the data object is related to other data objects in the DPU or in another DPU. For example, the method 1300 may analyze the keywords in the local dictionary and/or a remote dictionary to determine whether the object is related to other data objects in the DPU or in another DPU. If the data objet is related to other data objects in the DPU or in another DPU, the method 1300 may update the relationship table at block 1325.

Figure 14:
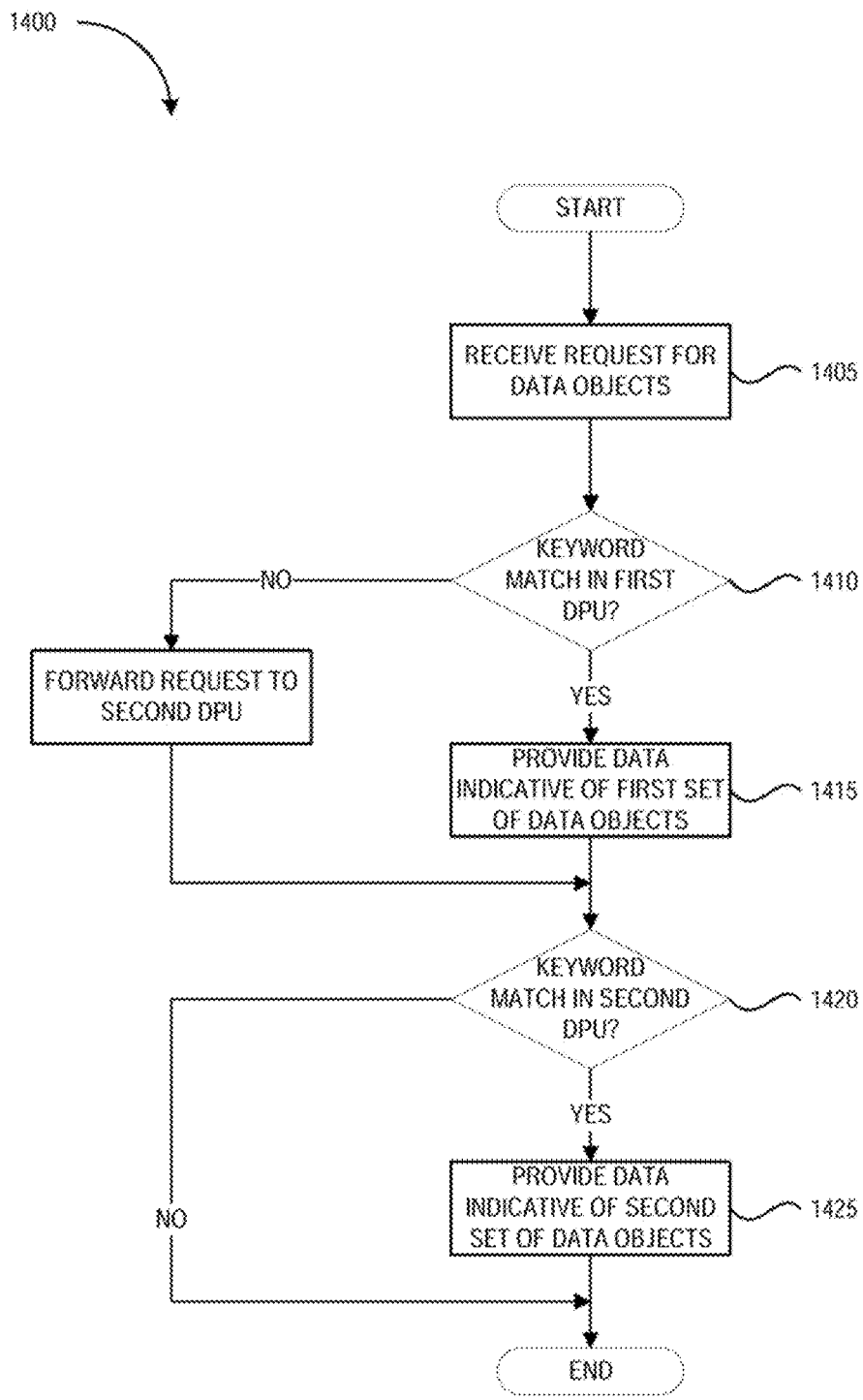
FIG. 14 is a flowchart illustrating an example a method for retrieving one or more data objects in a data processing unit system in accordance with one or more embodiments

FIG. 14 is a flowchart illustrating an example a method 1400 for retrieving one or more data objects in a DPU system (e.g., DPU system 1100 illustrated in FIG. 11), in accordance with one or more embodiments. The method 1400 may be performed by a DPU (e.g., DPU 38 illustrated in FIG. 11), a management component (e.g., management component 1130 illustrated in FIG. 11), a DPU system, etc. The DPU, DPU system, and/or management component may be processing logic that includes hardware (e.g., circuitry, dedicated logic, programmable logic, microcode, etc.), software (e.g., instructions run on a processor to perform hardware simulation), firmware, or a combination thereof.

The method 1400 begins at block 1405 where the method 1400 receives a request to retrieve one or more data objects from a requestor. The request includes one or more requested keywords that may be used to identify or select data objects, as discussed above. At block 1410, the method 1400 determines whether there is a keyword match in a first DPU. For example, the method 1400 may analyze a local dictionary of the first DPU to determine whether the data objects stored on the DPU are associated with keywords that match one or more of the requested keywords. If there is a keyword match, the method 1400 may provide data indicative of a first set of data objects. For example, the method 1400 may provide a preview and/or the first set of data objects to the requestor. The first set of data objects may be associated with keywords that matched one or more of the requested keywords. If there is no keyword match, the method 1400 may forward the request to second DPU.

At block 1420, the method 1400 may determines whether there is a keyword match in the second DPU. For example, the method 1400 may analyze a local dictionary of the second DPU to determine whether the data objects stored on the DPU are associated with keywords that match one or more of the requested keywords. If there is a keyword match, the method may provide data indicative of a second set of data objects at block 1425. For example, the method 1400 may provide a preview and/or the second set of data objects to the requestor. The second set of data objects may be associated with keywords that matched one or more of the requested keywords and are stored on the second DPU.

General Comments

Those skilled in the art will appreciate that in some embodiments, other types of systems, devices, and/or apparatuses can be implemented while remaining within the scope of the present disclosure. In addition, the actual steps taken in the processes discussed herein may differ from those described or shown in the figures. Depending on the embodiment, certain of the steps described above may be removed, others may be added.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A computing system comprising a first device, the first device comprising
   a non-volatile memory comprising a plurality of memory sub-arrays, wherein each memory sub-array comprises a plurality of selectable locations; and
   a plurality of data processing units communicatively coupled to the non-volatile memory in the absence of a central processing unit of the computing system;
   the plurality of data processing units configured to access the non-volatile memory without a central processing unit (CPU); and;
   the plurality of data processing units including:
      a data processing unit assigned to process data of a memory sub-array of the memory sub-arrays without the CPU; and
      the data processing unit thereby configured, without the CPU, to:
         receive a first data object via a communication interface, wherein the first data object comprises a first content and is associated with a first set of keywords;
         store the first data object in the non-volatile memory;
         add the first set of keywords to a local dictionary, wherein the local dictionary is stored in the non-volatile memory;
         determine whether the first data object is related to one or more other data objects; and
         in response to determining that the first data object is related to the one or more other data objects, create one or more relationships between the first data object and the one or more other data objects.

2. The computing system of claim I, wherein to determine whether the first data object is related to the one or more other data objects the data processing unit is further configured to:
   determine whether a first keyword of the first set of keywords matches a second keyword of a second data object, based on the local dictionary.

3. The computing system of claim 2, wherein the local dictionary comprises a first data indicating keywords that are associated with the data objects that are stored in the non-volatile memory.

4. The computing system of claim 1, wherein to determine whether the first data object is related to the one or more other data objects the data processing unit is further configured to:
   determine whether a first keyword of the first set of keywords matches a second keyword of a second data object, based on a remote dictionary.

5. The computing system of claim 4, wherein the remote dictionary comprises first data indicating keywords that are associated with data objects that are stored in a non-volatile memory of a second device in the computing system.

6. The computing system of claim 1, wherein to create one or more relationships between the first data object and the one or more other data objects the data processing unit is further configured to:
   update a relationship table to indicate that a first keyword associated with the first data object matches a second keyword associated with the second data object, wherein the second data object is stored in the non-volatile memory of the second device.

7. The computing system of claim 1, wherein to create one or more relationships between the first data object and the one or more other data objects the data processing unit is further configured to:
   update a relationship table to indicate that a first keyword associated with the first data. object matches a second keyword associated with the second data object, wherein the second data object is stored in a non-volatile memory of a second device in the computing system.

8. The computing system of claim 1, wherein a first keyword of the first set of keywords is based on the first content of the first data object.

9. The computing system of claim 1, wherein a first keyword of the first set of keywords is based on a second keyword of a second data object, wherein the second keyword is based on a content of the second data object.

10. A computing system comprising a first device, the first device comprising:
    a non-volatile memory comprising into a plurality of memory sub-arrays; wherein:
       each memory sub-array comprises a plurality of selectable locations;
       the non-volatile memory is configured to store a plurality of data objects; and
       each data object comprises content and is associated with one or more keywords; and
    a plurality of data processing units communicatively coupled to the non-volatile memory in the absence of a central processing unit (CPU) of the computing system;
    wherein a data processing unit of the plurality of data processing units is assigned to process data of a memory sub-array of the memory sub-arrays without the CPU; and
    the data processing unit is thereby configured, without the CPU, to:
       receive a request to retrieve one or more data objects from a requestor, wherein the request comprises a set of keywords; and
       determine whether any data objects stored in the non-volatile memory are a match for the one or more keywords of the set of keywords based on a local dictionary, wherein the local dictionary is stored in the non-volatile memory;
       in response to determining that a first set of data objects are a match for the one or more keywords of the set of keywords, provide first data indicative of the first set of data objects to the requestor;
       determine whether any data objects stored in a non-volatile memory of a second device are a match for the one or more keywords of the set of keywords based on a remote dictionary, wherein the remote dictionary is stored in the non-volatile memory; and
       in response to determining that the one or more data objects are stored in the non-volatile memory of the second device, forward the request to the second device.

11. The computing system of claim 10, wherein to provide the first data indicative of the first set of data objects to the requestor the data processing unit is further configured to:
    retrieve the first set of data objects from the non-volatile memory; and
    provide the first set of data objects to the requestor.

12. The computing system of claim 10, wherein the first data comprises one or more of:
- a list of data objects in the first set of data objects; and
- a list of identifiers for the data processing units.

13. The computing system of claim 10, wherein the data processing unit is further configured to:
- receive, from the second device, second data indicative of a second set of data objects that are a match for the one or more keywords of the set of keywords; and
- provide the second data to the requestor.

14. The computing system of claim 10, wherein the data processing unit is further configured to:
- select the first set of data objects based on a number of relationships associated with the first set of data objects.

15. The computing system of claim 10, wherein the data processing unit is further configured to:
- select the first set of data objects based on when the first set of data objects is stored in the non-volatile memory.

16. The computing system of claim 10, wherein the local dictionary comprises second data indicating keywords that are associated with data objects that are stored in the non-volatile memory of the first device.

17. The computing system of claim 10, wherein the remote dictionary comprises second data indicating keywords that are associated with data objects that are stored in the non-volatile memory of the second device.

18. A method, comprising:
- receiving, by a data processing unit of a plurality of data processing units, a first data object via a communication interface, wherein the plurality of data processing units are communicatively coupled to a non-volatile memory for memory access in the absence of a central processing unit (CPU), and the pluralit of data processing units comprise the data processing unit, wherein:
  - the first data object comprises a first content and is associated with a first set of keywords;
  - the non-volatile memory comprises a plurality of memory sub-arrays;
  - each memory sub-array comprises a plurality of selectable locations; and
  - the data processing unit is assigned to process data of a memory sub-array of the memory sub-arrays without the CPU;
- storing, by the data processing unit, the first data object in the non-volatile memory;
- adding, by the data processing unit, the first set of keywords to a local dictionary, wherein the local dictionary is stored in the non-volatile memory;
- determining, by the data processing unit, whether the first data object is related to one or more other data objects; and
- in response to determining that the first data object is related to one or more other data objects, creating, by the data processing unit, one or more relationships between the first data object and the one or more other data objects.

19. The method of claim 18, wherein determining whether the first data object is related to the one or more other data objects comprises:
- determine whether a first keyword of the first set of keywords matches a second keyword of a second data object, based on the local dictionary.

* * * * *